US011758379B2

(12) United States Patent
Lansford

(10) Patent No.: US 11,758,379 B2
(45) Date of Patent: Sep. 12, 2023

(54) AUTOMATED ASSESSMENT OF A TOWED OBJECT DIMENSIONS

(71) Applicant: QUALCOMM Incorporated, San Diego, CA (US)

(72) Inventor: James Lansford, Cascade, CO (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/206,057

(22) Filed: Mar. 18, 2021

(65) Prior Publication Data
US 2022/0303743 A1 Sep. 22, 2022

(51) Int. Cl.
H04W 4/80 (2018.01)
H04W 4/38 (2018.01)
H04W 4/46 (2018.01)
H04N 7/18 (2006.01)

(52) U.S. Cl.
CPC ............... *H04W 4/80* (2018.02); *H04N 7/18* (2013.01); *H04W 4/38* (2018.02); *H04W 4/46* (2018.02)

(58) Field of Classification Search
CPC .......... H04W 4/80; H04W 4/38; H04W 4/46; H04W 4/02; H04W 4/20; H04W 4/40; H04N 7/18; B60D 1/30; B60D 1/305; B60D 1/62; G08G 1/096758; G08G 1/096791; G08G 1/163; G08G 1/166; G08G 1/096716
USPC ...................................................... 455/41.2
See application file for complete search history.

(56) References Cited

U.S. PATENT DOCUMENTS

| 2013/0147953 | A1* | 6/2013 | Rao ........................... B60R 1/00 348/148 |
| 2015/0235481 | A1* | 8/2015 | Greenberger ............ G07C 5/08 701/29.6 |
| 2017/0217372 | A1* | 8/2017 | Lu ........................... H04N 5/247 |
| 2017/0254873 | A1* | 9/2017 | Koravadi ................... G01S 3/14 |
| 2019/0092233 | A1* | 3/2019 | Gibson .................. B60Q 9/008 |
| 2019/0129426 | A1* | 5/2019 | Garcia ................. G05D 1/0088 |
| 2020/0202292 | A1* | 6/2020 | Doig ..................... H04W 4/029 |
| 2020/0247200 | A1* | 8/2020 | Ferrer ................... G01S 5/0284 |

(Continued)

FOREIGN PATENT DOCUMENTS

| WO | 2018178052 A1 | 10/2018 |
| WO | 2019083511 A1 | 5/2019 |

OTHER PUBLICATIONS

Svenson A.L., et al., "Development of a Basic Safety Message for Tractor-Trailers for Vehicle-to-Vehicle Communications", National Highway Traffic Safety Administration, 2015, pp. 1-12.

(Continued)

*Primary Examiner* — Ankur Jain
(74) *Attorney, Agent, or Firm* — The Marbury Law Group, PLLC

(57) ABSTRACT

Embodiments include systems and methods for automatically populating a safety message, such as a Basic Safety Message (BSM), with a position and combined length of a vehicle and a towed object. Some embodiments include determining a distance from one or more antennas coupled to a receiver in the vehicle to a remote sensor on the towed object by processing short-range wireless signals received from the remote sensor. Some embodiments include populating the safety message with a position of the vehicle and the towed object based on the determined distance from the one or more antennas to the remote sensor.

19 Claims, 12 Drawing Sheets

(56) References Cited

U.S. PATENT DOCUMENTS

2020/0382925 A1* 12/2020 Doig .................... G01S 5/0072
2021/0300136 A1*  9/2021 Algüera ................. H04W 4/80

OTHER PUBLICATIONS

International Search Report and Written Opinion—PCT/US2022/013648—ISA/EPO—dated May 11, 2022; 14 pages.

* cited by examiner

AUTOMATED ASSESSMENT OF A TOWED OBJECT DIMENSIONS

BACKGROUND

The automotive industry is deploying vehicle-to-vehicle (V2V) technology, which is a form of vehicle-to-anything (V2X) communications that enables vehicles to exchange information with one another, with road side infrastructure, and with other entities involved in providing an Intelligent Transportation System (ITS). Dedicated Short Range Communication (DSRC) and Cellular-V2X (C-V2X, also known as LTE-V2X) wireless communication are examples of communication technologies used in V2X systems.

Vehicles equipped with V2X systems periodically transmit messages including safety messages, which convey information about the vehicle useful for avoiding collisions and route planning by autonomous and semi-autonomous vehicles as well as traffic management systems. Safety messages may include vehicle localizing information, such as position, vehicle dimensions, velocity, and acceleration. Safety messages are transmitted by vehicles to enable other vehicles within communication range to assess whether there are roadway hazards and avoid collisions. Various forms of safety messages are defined in V2X standards, such as the SAE J2735 Message Set Dictionary or the ETSI EN 302 637 family of specifications under ETSI ITS-G5. Examples of safety messages defined in different V2X standards include a "Basic Safety Message" (BSM), a "Cooperative Awareness Message" (CAM), and a "Decentralized Environmental Notification Message" (DENM). For ease of description but not limitation, all forms and protocols of safety messages will be referred to herein as "BSMs."

In the case of a vehicle towing something (referred herein as a "towed object"), such as a trailer, boat, camper, or another vehicle, the BSM is supposed to include the total length of the combination of the towing vehicle and the towed object. Currently, the length of a towed objection has to be entered into the vehicle's V2X system manually, such as by a user. Given human error or failure to enter information, this requirement for manual information entry means that sometimes the length of the towed object is not entered and thus not reflected in BSMs. When this happens, the BSMs fail to notify other vehicles of the actual combined length of the towing vehicle and the towed object or that there is even an object being towed.

SUMMARY

Various aspects include methods, processing systems, and computing devices implementing the methods for automatically populating safety messages with towing vehicle and towed object position and combined length information. Various aspects may include determining a distance from one or more antennas coupled to a receiver in the vehicle to a remote sensor on the towed object by processing short-range wireless signals received from the remote sensor and populating a safety message with a position of the vehicle and the towed object based on the determined distance from the one or more antennas to the remote sensor. In some aspects, the safety messages may be one of a Basic Safety Message (BSM), a "Cooperative Awareness Message" (CAM), or a "Decentralized Environmental Notification Message" (DENM).

In some aspects, the short-range wireless signals may be at least one of Wi-Fi, Bluetooth, or ultra-wide band signals. In some aspects, the remote sensor may be a camera, and the short-range wireless signals encode image data from the camera. Some aspects may further include receiving the short-range wireless signals in a video monitoring system of the vehicle, wherein processing the short-range wireless signals received from the camera to determine the distance from the one or more antennas in the vehicle to the remote sensor on the towed object is performed by the video monitoring system.

Some aspects may further include providing to a vehicle-to-everything (V2X) processing system the determined distance from one or more antennas coupled to the receiver in the vehicle to the camera on the towed object in a format that enables the V2X processing system to automatically populate fields in safety messages with information regarding locations or length of the vehicle and the towed object. In some aspects, the short-range wireless signals may encode data from the remote sensor. Some aspects may further include processing the short-range wireless signals received from the remote sensor to obtain information regarding movement of the towed object relative to the vehicle. Some aspects may further include processing the short-range wireless signals received from the remote sensor to determine whether movement of the towed object relative to the one or more antennas coupled to receiver in the vehicle satisfies a dangerous or critical vehicle movement criterion, and including an indication of a critical event, such as populating a critical event flag, in the safety messages in response to determining that the movement of the towed object relative to the one or more antennas coupled to receiver in the vehicle satisfies a dangerous or critical vehicle movement criterion.

Further aspects may include a vehicle system, such as a V2X system, including a processor configured with processor-executable instructions to perform operations of any of the methods summarized above. Further aspects include a vehicle system including means for performing functions of any of the methods summarized above. Further aspects include a non-transitory processor-readable storage medium having stored thereon processor-executable software instructions configured to cause a processor of a vehicle system to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
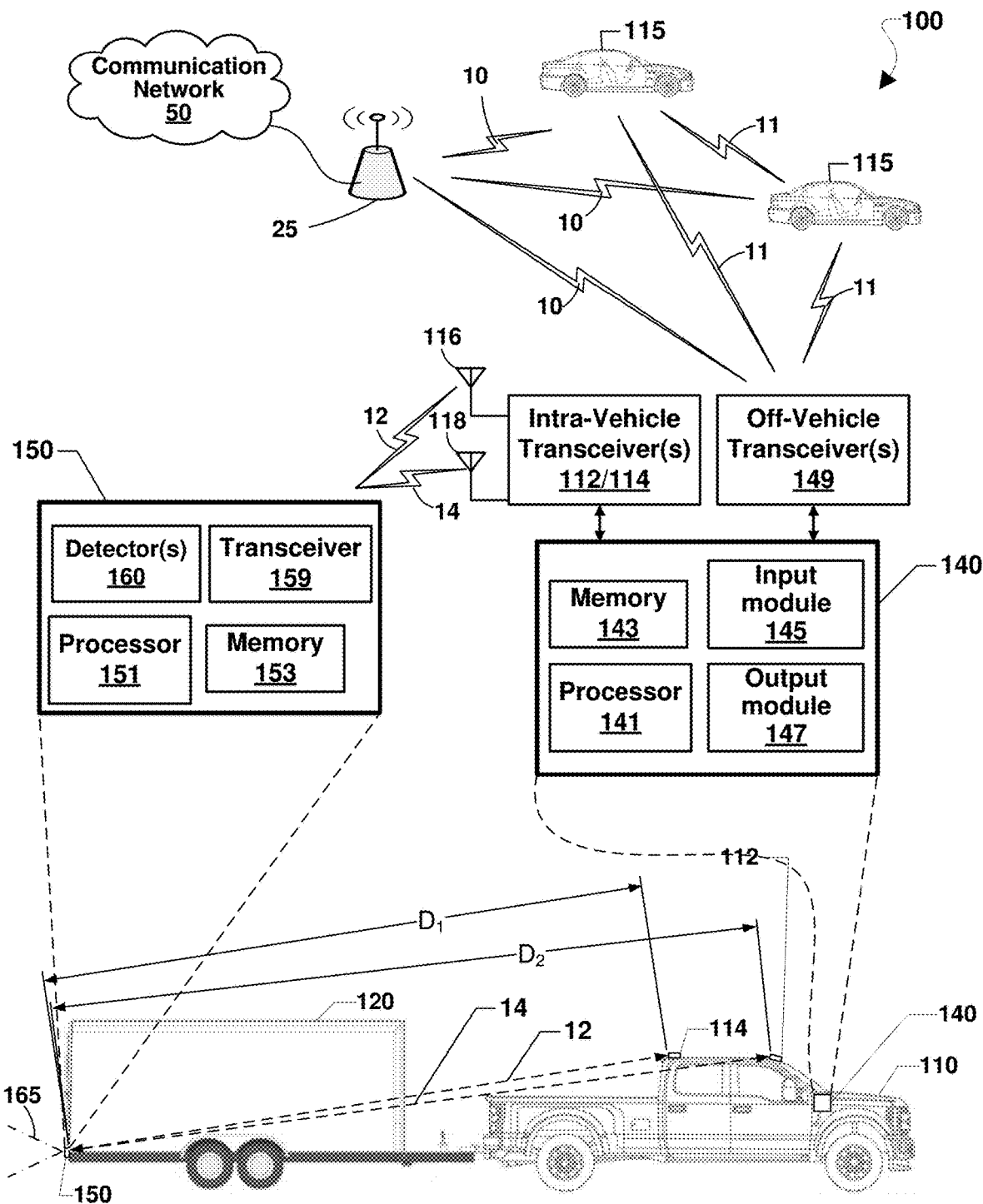
FIGS. 1A and 1B are schematic diagrams illustrating example vehicle processing systems in a vehicle connected to a towed object with a remote sensor suitable for implementing any of various embodiments.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Many sensors, such as wireless video cameras, are available that may be mounted on a towed object to provide information to the towing vehicle or the driver thereof. For example, a backup camera mounted on the back of a trailer may allow a driver of the towing vehicle to monitor the environment behind the trailer and aid in backing up the combined vehicles. Similarly, other sensors may be mounted on the towed object, such as accelerometers, proximity sensors, motion sensors, radar, lidar etc. Such sensors may use Wi-Fi, Bluetooth, Ultra-wide band (UWB), or other short-range wireless technologies to send data (e.g., video images) to the towing vehicle. Many short-range wireless technologies, like Wi-Fi, Bluetooth, and Ultra-wide band (UWB) include capabilities to determine the distance traveled by signals, such as ranging techniques. Examples include High Accuracy Indoor Positioning (HAIP) in Bluetooth, Wi-Fi Location (using Fine Timing Measurement or IEEE 802.11az), or IEEE 802.15.4z for UWB.

Various embodiments include methods and systems that leverage conventional sensors, like backup cameras, that can be mounted on a towed object (i.e., a trailer) and use Wi-Fi, Bluetooth, UWB, or other short-range wireless signals to communicate with one or more receivers on the towing vehicle. In various embodiments, the same short-range wireless signals used for communications between the remote sensor (e.g., backup camera) and the receiver on the towing vehicle are used to measure distance the distance between the sensor and one or more antennas on the towing vehicle. By using Wi-Fi, Bluetooth, or UWB ranging techniques, the distance between the remote sensor located on the towed object and the one or more antennas located on the towing vehicle may be automatically measured, relieving the operator of the need to estimate or physically measure the distance to the back end of the towed object from either the front or rear end of the towing object as would be required to manually enter this information in V2X system. The automatically measured distance may be used by a vehicle system, such as a V2X system, to populate BSM messages with accurate trailer position and dimension data, including in particular the combined or overall length of the towing vehicle and the towed object.

Various embodiments enable simple off-the-shelf sensors, like wireless backup cameras or proximity sensors, to be used to automatically provide information regarding the distance to the end of a towed object (e.g., a trailer) that a V2X system can use to populate BSM messages with the position and combined length of the combination of the towing vehicle and the towed object. This relieves the operator of the need to manually enter into the V2X system trainer or combination vehicle and trailer length information. Thus, such sensors, which tend to be inexpensive, may be used to provide new safety features, including ensuring the vehicle length data is accurate in BSM transmissions by towing vehicles. In addition, such new safety features may be added to vehicles without the need for wiring or complex system integration, which may be difficult and/or expensive.

As used herein, the term "vehicle" refers to one of various types of vehicles, such as automobiles, trucks, buses, etc. A vehicle may be autonomous, semi-autonomous, or non-autonomous, operating with and/or without onboard human drivers. A vehicle may include an onboard computing device configured to receive and transmit ITS messages (e.g., BSMs) to one or more other nearby vehicles and/or base stations (e.g., Node B/eNodeB) via wireless communications in accordance with various embodiments. C-V2X has two different modes of communication, namely Mode 3, which includes communication to infrastructure, and Mode 4, in which vehicles communicate with each other directly (i.e., V2V) without any infrastructure (also referred to as sidelink communications).

As used herein, the term "V2X system" refers to any of a variety of vehicle processing and communication systems configured to transmit and receive messages consistent with an ITS standard, including the generation and transmission of BSMs. A V2X system (also known as a "wireless device") may include at least a processor, communication system, and memory (i.e., electronic storage) within or built into a vehicle for transmitting and receiving ITS messages (e.g., BSMs) via wireless communications. A V2X system may be equipped with a mobile broadband adapter, and/or any similar device(s) configured to connect to a base station, as specified in 3GPP specifications, European Telecommunications Standards Institute (ETSI) specifications, IEEE specifications, or other similar specifications. V2X systems may support sidelink communications between two or more other V2X systems. For example, a first vehicle having sidelink communication resources may be configured to transmit messages to a second vehicle configured to receive sidelink communications, and vise-versa. Sidelink communications may be conducted without the support of a communication network. Sidelink communications may include logical sidelink channels for V2X systems to exchange and coordinate settings and data to control signaling and coordinate the use of the allocated frequencies. The more information a V2X system has about the availability of sidelink communication resources, the more efficiently the V2X system may perform sidelink communications.

As used herein, the term "base station" refers to an entity that communicates with wireless devices (e.g., V2X systems), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The base station may provide a connection between communicating vehicles and/or communicate directly with one or more vehicles. The base station may operate as a hub for communications to and/or from one or more vehicles. A base station may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station may support one or multiple (for example, three) cells. The terms "eNB", "base station", "NR BS", "gNB". "TRP", "AP", "node B", "5G NB", and "cell" may be used interchangeably herein.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM. Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "component." "system." "unit." "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. As an illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate As a local and/or remote processes, function or procedure calls, electronic signals, data packets, memory read/writes, and other known computer, processor, and/or process related communication methodologies.

Figure 1B:
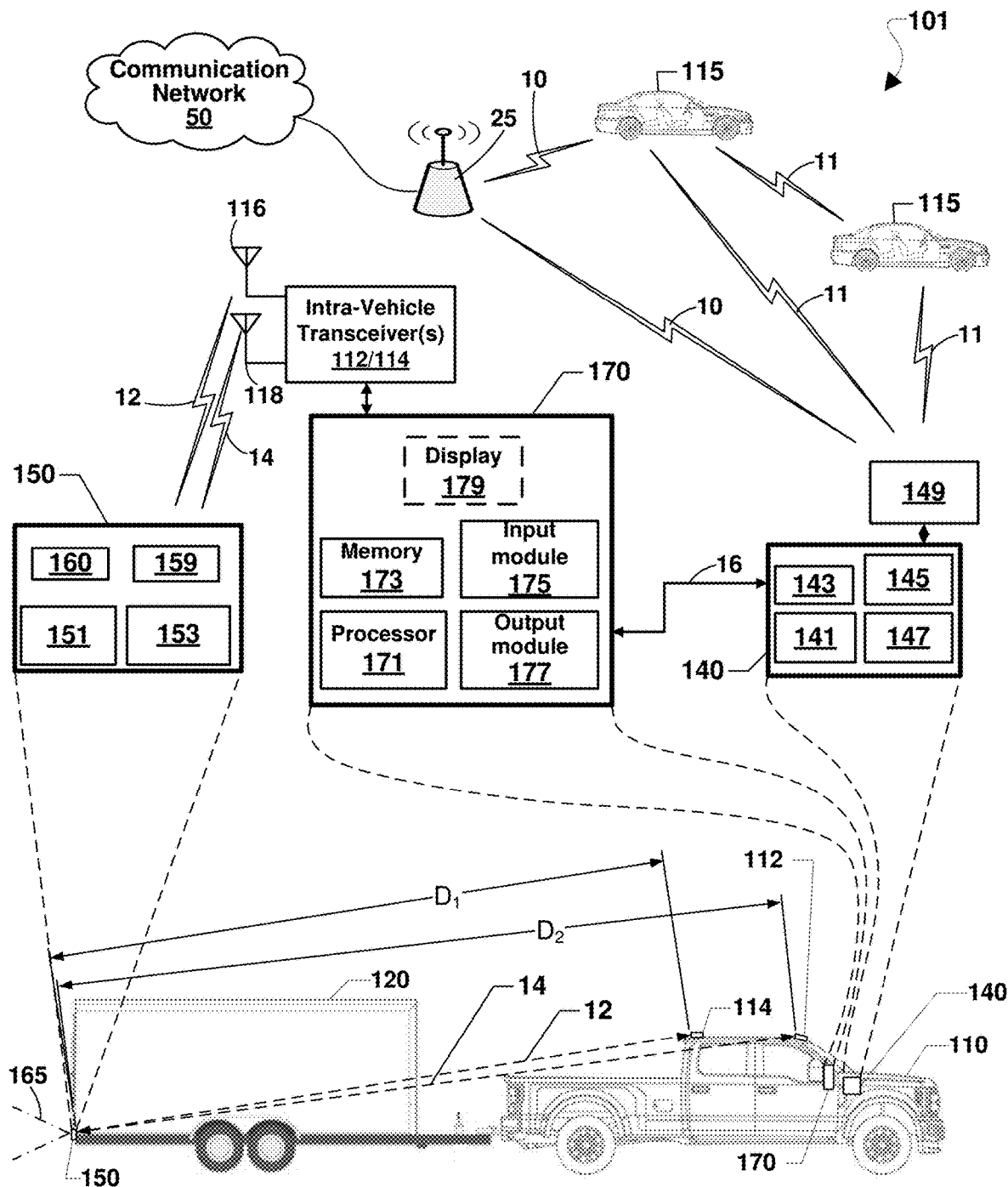

Various embodiments may be implemented within a variety of intelligent transportation systems, an examples of which are illustrated in FIG. 1A as system 100 and in FIG. 1B as system 101. In the example system 100 illustrated in FIG. 1A, processes of determining distances to remote sensor 150 on the rear of a towed object are performed within a V2X system. In the example system 101 illustrated in FIG. 1B, processes of determining distances to the remote sensor 150 on the rear of a towed object are performed within an intermediate processing system, such as a backup camera display system, with distance information determined by the intermediate processing system provided to the V2X system for use in populating BSMs.

With reference to FIG. 1A, the transportation control system 100 may include a towing vehicle 110 connected to a towed object 120, such as any type of trailer (e.g., camper, flatbed, enclosure, refrigerated, lowboy, step deck, gooseneck, specialty, etc.). The towed object 120 may be any object configured to be hauled by a vehicle on roads, including automotive and non-automotive vehicles. In addition, the transportation control system 100 may include one or more additional vehicle(s) 115 and/or one or more base stations 25, both configured to communicate with the towing vehicle 110 traveling on a roadway.

The towing vehicle 110 and the additional vehicle(s) 115 may be configured to use radar systems for navigation, measuring distances, proximity alerts, and other vehicular functions. Such radar systems may enable or assist the vehicles 110, 115 in avoiding collisions and staying on the roadway. In addition, each vehicle 110, 115 may also be configured to compile and transmit BSMs through sidelink communications (i.e., PC5 in 3GPP), via a wireless communication link 11. The BSMs allow each vehicle to convey to another vehicle their own vehicle information, such as acceleration, velocity, position, and vehicle dimensions. The BSMs may also help the vehicles avoid collision with one another. In accordance with various embodiments, the towing vehicle 110 may be configured to generate and transmit enhanced BSMs, which include position and dimensional information corresponding to the towed object 120, to the additional vehicle(s) 115 and/or the base station(s) 25.

The base station(s) 25 and the additional vehicle(s) 115 may include various circuits and devices used to control operations thereof, such as a processor, memory, and transceiver(s) for receiving BSMs, such as from the towing vehicle 110 through wireless signals in a wireless communication link 10. The base station 25 may also receive BSMs from the additional vehicle(s) 115. In addition, the base station 25 exchange information with a communication network 50 and remote servers or other remote computing devices (e.g., transportation control server(s)).

In various embodiments, the towing vehicle 110 may include a V2X system 140, which may include various circuits and devices used to control operations thereof. In the example illustrated in FIG. 1A, the V2X system 140 includes a processor 141, memory 143, an input module 145, and an output module 147. The V2X system 140 may communicate with other onboard vehicle resources (e.g., sensors, drive systems, navigation systems, etc.) using the input module 145 and output module 147. In addition, the V2X system 140 may be coupled to and configured to communicate through one or more intra-vehicle transceivers 112, 114 and off-vehicle transceiver(s) 149 using wireless communications. The intra-vehicle transceivers 112, 114 may be configured to be coupled to one or more antenna(s) 116/118 mounted on the vehicle and used to exchange or at least receive wireless signals in one or more wireless communication links 12, 14 from at least one remote sensor 150. The off-vehicle transceiver(s) 149 may be used to exchange wireless signals in wireless communication links 10, 11 with the base station(s) 25 or additional vehicle(s) 115, respectively.

In various embodiments, the remote sensor 150 may be a camera (e.g., a backup camera), accelerometer, proximity sensor, motion sensors, radar, lidar, or any device that detects, measures, or responds to properties of an environment or changes thereto. The remote sensor 150 may be battery powered (i.e., includes its own power source), powered from a power source on the towed object, and/or powered from a power source on the towing vehicle (e.g., through a wired connection). The remote sensor 150 may include a processor 151, memory 153, a transceiver 159, and detector components 160 configured to detect, measure, and/or respond to particular environmental properties. The remote sensor 150 may be configured to communicate sensor data (e.g., image or video data) to the V2X system 140 using the transceiver 159 (e.g., a radio-frequency transmitter) through wireless communications by exchanging signals over the wireless communication links 12, 14 with the intra-vehicle transceiver(s) 112/114. The transceiver 159 may be a short-range device that uses low-power (e.g., 25-100 milliwatts effective radiated power (ERP) or less, depending on the frequency band). Such short-range devices generally have a limited useful range of at most a hundred meters, but do not require a license and tend to be less expensive than higher power (i.e., longer range) devices. As used herein, the expression "short-range wireless signals" refers to signals that travel from a few centimeters to several meters, as defined by IEEE 802.15.4, which is a technical standard that defines operation of low-rate wireless personal area networks.

In various embodiments, the wireless communication links 12,14 may use short-range wireless signals, such as Wi-Fi, Bluetooth, and/or UWB, which may also provide ranging and/or position location information. For example, in the embodiment illustrated in FIG. 1A, if the remote sensor 150 is a backup camera, a video stream of its field of view 165 may be relayed to the V2X system 140 the intra-via the vehicle transceiver(s) 112/114 over one or both of the wireless communication links 12, 14. In addition, using any of a variety of wireless signal ranging techniques analyzing the signals forming the wireless communication links 12, 14 between the remote sensor 150 and the antenna(s) 116/118. In this manner, the wireless communication links 12, 14 used to transmit sensor data may also be used to determine distances (e.g., $D_1$, $D_2$) to the remote sensor 150 on the towing vehicle 110, particularly from the sensor transceiver 159, to each of the one or more antenna(s) 116/118 mounted on the vehicle and coupled to the intra-vehicle transceiver(s) 112, 114.

The V2X system 140 may receive the short-range wireless signals from the transceiver 159 via the wireless communication links 12, 14 and the intra-vehicle transceiver(s) 112/114. The wireless communication links 12, 14 may be bidirectional or unidirectional communication links, and may use one or more communication protocols. For example, if the remote sensor 150 is a backup camera the short-range wireless signals may encode image data from the camera, such as a video stream, which may be received by the V2X system 140. In addition, control commands may be transmitted from the V2X system 140 to the remote sensor 150. In some embodiments, the processor 141 of the V2X system 140 may process the video stream, such as on a display inside the towing vehicle 110.

Alternatively, a separate or intermediate processor may be used to process the video stream as illustrated in FIG. 1B, as well as perform operations of determining distances (e.g., $D_1$, $D_2$) to the remote sensor 150 on the towing vehicle 110, and providing the distance information to the V2X system 140 (e.g., via a data cable connection). In some embodiments some or all of the components (e.g., the processor 141, the memory 143, the input module 145, the output module 147, the intra-vehicle transceiver(s) 112, 114, and/or the off-vehicle transceiver(s) 149) may be integrated in a single device or module, such as a system-on-chip (SOC) processing device. Such an SOC processing device may be configured for use in vehicles and be configured, such as with processor-executable instructions executing in the processor 141, to perform operations of various embodiments.

FIG. 1B is schematic diagram illustrating another example transportation control system 101 suitable for implementing any of various embodiments. With reference to FIG. 1B, the transportation control system 101 may include the same or similar elements to those described with regard to the transportation control system 100 above. In addition, the transportation control system 101 may include an intermediate processing system 170 that is separate from the V2X system 140 of the towing vehicle 110. For example, the intermediate processing system 170 may be a dedicated sensor monitoring system, such as a video monitoring system for a backup camera.

The intermediate processing system 170 may perform some of the V2X system 140 functionality of the transportation control system 100. In particular, the intermediate processing system 170 may receive the short-range wireless signals, from the transceiver 159 via the wireless communication links 12, 14 and the intra-vehicle transceiver(s) 112/114. The wireless communication links 12, 14 may be bidirectional or unidirectional communication links, and may use one or more communication protocols. Thus, the short-range wireless signals received by the intermediate processing system 170 from the transceiver 159 may encode data from the remote sensor 150, such as a video stream. The intermediate processing system 170 may process (i.e., decode) the data encoded in the short-range wireless signals. In addition, control commands may be transmitted from the intermediate processing system 170 to the remote sensor 150 using one or both of the wireless communication links 12, 14.

The intermediate processing system 170 may include a processor 171, memory 173, an input module 175, and an output module 177. In addition, the intermediate processing system 170 may optionally include or be coupled to a display 179 for presenting (i.e., outputting) processed data from the remote sensor 150. The intermediate processing system 170 may communicate with the main V2X system 140, as well as other onboard vehicle resources (e.g., sensors, drive systems, navigation systems, etc.) using the input module 175 and output module 177. Such communications with onboard vehicle resources may use wired or wireless connections 16 that may be bidirectional or unidirectional. In addition, the intermediate processing system 170 may be coupled to and configured to communicate through one or more of the intra-vehicle transceivers 112, 114 using wireless communications. The intra-vehicle transceivers 112, 114 may be used to exchange or at least receive wireless signals in one or more wireless communication links 12, 14 from the at least one remote sensor 150.

In some embodiments, the intermediate processing system 170 may process the short-range wireless signals received from the remote sensor 150 to determine the distance(s) (e.g., $D_1$, $D_2$) from one or more antennas coupled the receiver (i.e., the intra-vehicle transceivers 112, 114 of the towing vehicle 110) to the remote sensor 150 on the towed object 120. In addition, the intermediate processing system 170 may then provide (i.e., transmit) the determined distance(s) (e.g., $D_1$, $D_2$) information to the V2X system 140 in a format that enables the V2X system to automatically populate fields in a Basic Safety Messages with information regarding locations or length of the vehicle and the towed object. Alternatively, the intermediate processing system 170 may pass along the short-range wireless signals or at least timing information thereof to the V2X system 140 for the distance determinations to be made by the V2X system 140. Subsequently, the V2X system 140 may compile and populate one or more BSM's to include the position and combined length of the vehicle and the towed object based on the determined distance(s) from the remote sensor 150 to the one or more antennas (e.g., 116, 118) coupled to one or more receivers (e.g., 112, 114). Thereafter, the V2X system 140 may use the off-vehicle transceiver(s) 149 to transmit the enhanced BSMs to the base station(s) 25 and/or the additional vehicle(s) 115.

In various embodiments a processor, either an intermediate processor 171 as illustrated in FIG. 1B or the V2X system processor 141 as illustrated in FIG. 1A, may be configured with processing capabilities to perform ranging computations that use the short-range wireless signals of the wireless communication links 12, 14 to determine distances between the remote sensor 150 and the antennas 116/118 coupled to respective intra-vehicle transceiver(s) 112/114. For example, the ranging computations may use time-of-flight or round-trip-time of the short-range wireless signals to determine the distance. In this way, a first distance $D_1$ may be determined from a first antenna 116 coupled to a first intra-vehicle transceiver 112, at least functioning as a first receiver, to the remote sensor 150 on the towed object 120. In particular, the first distance $D_1$ represents a straight-line distance between the transceiver 159 of the remote sensor 150 and the first antenna 116 coupled to a first intra-vehicle transceiver 112 of the towing vehicle 110. In addition, by using a second intra-vehicle transceivers 114, a second distance $D_2$ may be determined from a second antenna 118 coupled to a second intra-vehicle transceiver 114, at least functioning as a second receiver, to the remote sensor 150 on the towed object 120. Similarly, the second distance $D_2$ represents a straight-line distance between the transceiver 159 of the remote sensor 150 and the first antenna 116 coupled to the second intra-vehicle transceiver 114 of the towing vehicle 110. Using more than one antenna 116, 118 may provide redundancies for ensuring more accurate measurements. Also, by having at least two separate antennas 116, 118 coupled to intra-vehicle transceivers (e.g., 112, 114) movements of the towed object 120 relative to the towing vehicle 110 may more accurately be detected through triangulation as described with reference to FIGS. 2A and 2B.

In various embodiments, the processor 141 may include V2X processing capabilities configured to calculate vehicle position and/or dimension information, as well as populate BSM's with that information. Once one or both of the first and second distances $D_1$, $D_2$ are determined (e.g., by an intermediate processor or by the V2X processor 141), the processor 141 may populate BSMs with a position of the towed object based on the determined distance(s) $D_1$, $D_2$. In addition, the processor may populate the BSMs with a position of the towing vehicle 110 itself.

The off-vehicle transceiver(s) 149 may be configured for wireless communication by exchanging signals in one or more wireless communication links 10, 11 with the base station 25 and/or the additional vehicle(s) 115. The exchanged signals may include encoded information, such as BSMs, command signals for controlling maneuvering, signals from navigation facilities, etc. The wireless communication links 10, 11 may include a plurality of carrier signals, frequencies, or frequency bands, each of which may include a plurality of logical channels. Also, the wireless communication links 10, 11 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 10, 11 within the communication system may include medium range protocols such as LTE-U, LTE-Direct, LAA, MuLTEfire. Cellular V2X (also known as LTE-V2X) and relatively short range RATs such as Wi-Fi, ZigBee, Bluetooth, UWB, and Bluetooth Low Energy (LE).

The input module 145 may receive sensor data from one or more other vehicle sensors (e.g., a radar system) as well as electronic signals from other components, including the drive control components and the navigation components. The output module 147 may be used to communicate with or activate various components of the towing vehicle 110, including the intra-vehicle transceiver(s) 112, 114, the off-vehicle transceiver(s) 149, drive control components, navigation components, the sensor(s) directly onboard the towing vehicle 110, and the remote sensor(s) 150.

Figure 2A:
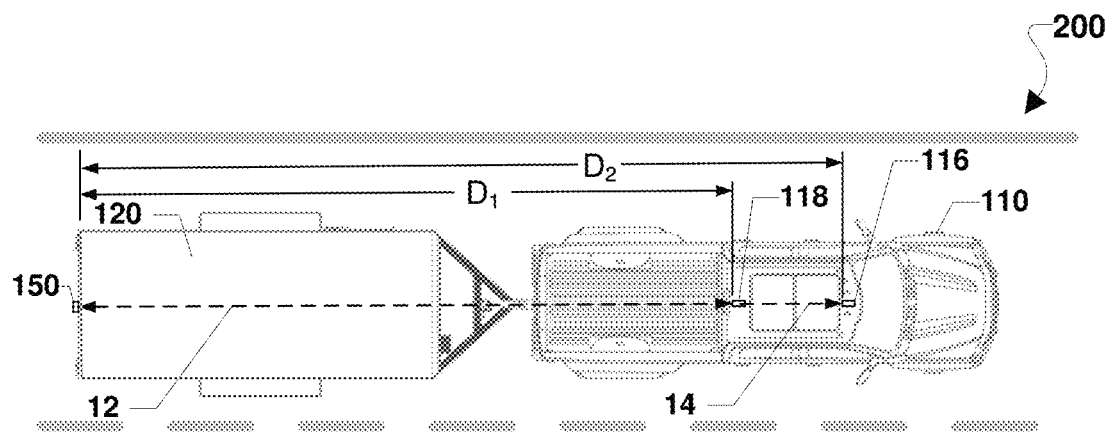
FIGS. 2A and 2B are schematic diagrams illustrating detectable movements of a towed object relative to the connected vehicle in accordance with various embodiments.
Figure 2B:
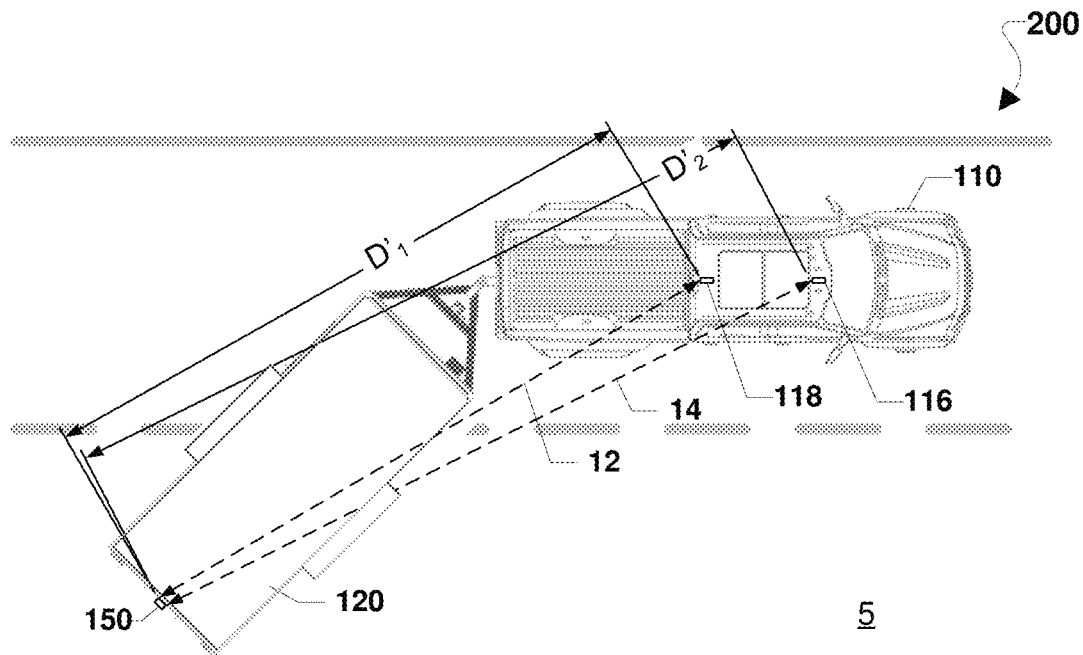

FIGS. 2A and 2B illustrate plan views 200 of a towing vehicle 110 connected to a towed object 120 traveling on a roadway 5. With reference to FIG. 2A, the towing vehicle 110 is driving in one of the two lanes with the towing object 120 following directly behind. In accordance with various embodiments, a vehicle system (e.g., the V2X system 140, intermediate processing system 170) may determine the one or more distances $D_1$, $D_2$ from a one or more antennas on the towing vehicle, such as one or both of the antennas 116, 118 coupled to intra-vehicle transceivers 112, 114, to a remote sensor 150 on the towed object 120 by processing short-range wireless signals in the wireless communication links 12, 14 received from the remote sensor 150.

With reference to FIG. 2B, the towing vehicle 110 is still driving in one of the two lanes of the roadway 5, but now the back end of the towing object 120 has swerved into an adjacent lane. In accordance with various embodiments, processing the short-range of wireless signals received from the remote sensor 150 may include obtaining information regarding movements of the towed object 120 relative to the towing vehicle 110. As shown, the lateral movement of the back end of the towed object 120 has caused a change in the distances between the antennas 116, 118 and the remote sensor 150. In particular, the distances have changed to shorter distances $D'_1$, $D'_2$.

Lateral movements of the back end of the towed object 120 will change (typically shorten) the distances between the antennas 116, 118 and the remote sensor 150. Thus, by continuously or regularly determining and monitoring the distances $D'_1$, $D'_2$, a vehicle system (e.g., the V2X system 140, intermediate processing system 170) may detect when towed object movements satisfy criteria indicating dangerous vehicle movements. For example, extreme swerving of the towed object 120 may be detected when either of the distances $D'_1$, $D'_2$ shorten by more than a threshold change in distance. The threshold change in distance may be stored in the vehicle system (e.g., within the V2X system, an intermediate processing system, or within a separate camera display system) as a criterion for a dangerous vehicle movement condition (i.e., a dangerous swerve). As another example, the back end of the towed object 120 may experience smaller fishtailing-type lateral movements that do not satisfy the predetermined threshold change distance, but in cycling from side to side, the regular or periodic changes in either of the distances $D'_1$, $D'_2$ for more than a threshold number of cycles may satisfy a different criterion for a dangerous vehicle movement (i.e., dangerous fishtailing).

Thus, in some embodiments, the vehicle system (e.g., the V2X system 140, intermediate processing system 170) may process the short-range wireless signals received from the remote sensor 150 to determine whether changes in the distance to the end of the towed object 120 from the antennas 116, 118 on the towing vehicle 110 satisfies a dangerous vehicle movement criterion, such indicative of as extreme swerving or fishtailing. For example, a dangerous vehicle movement pattern criterion may be satisfied when observed changes in the measured distance match a predetermined pattern of regular shifts in the measured distance exceeding a threshold difference that is consistent with dangerous fishtailing. In response to determining that the movement of the towed object 120 relative to the one or more antennas on the towing vehicle 110 satisfies a dangerous or critical vehicle movement criterion, the V2X system may populate a critical event flag in a BSM to alert other vehicles to the potential danger.

In assessing the movements of the towed object 120, the vehicle system (e.g., the V2X system 140, intermediate processing system 170) may take into account a current trajectory or path of the towing vehicle 110. For example, if the towing vehicle 110 is rounding a sharp turn, the relative positions of the towing vehicle 110 and the towed object 120 shown in FIG. 2B does not satisfy a dangerous or critical vehicle movement criterion because the towed object 120 is following the towing vehicle 110, and thus not swerving. Similarly, a duration or periodicity of changes in the distance measurement indicative of movements of the towed object 120 may also be taken into account, because a single or infrequent swerve of the towed object may be caused by wind or roadway conditions, and thus not an indication of dangerous fishtailing. Thus, a swerving or fishtailing event that only lasts seconds may not satisfy a dangerous or critical vehicle movement criterion if it does not reoccur or only reoccurs infrequently.

Figure 3A:
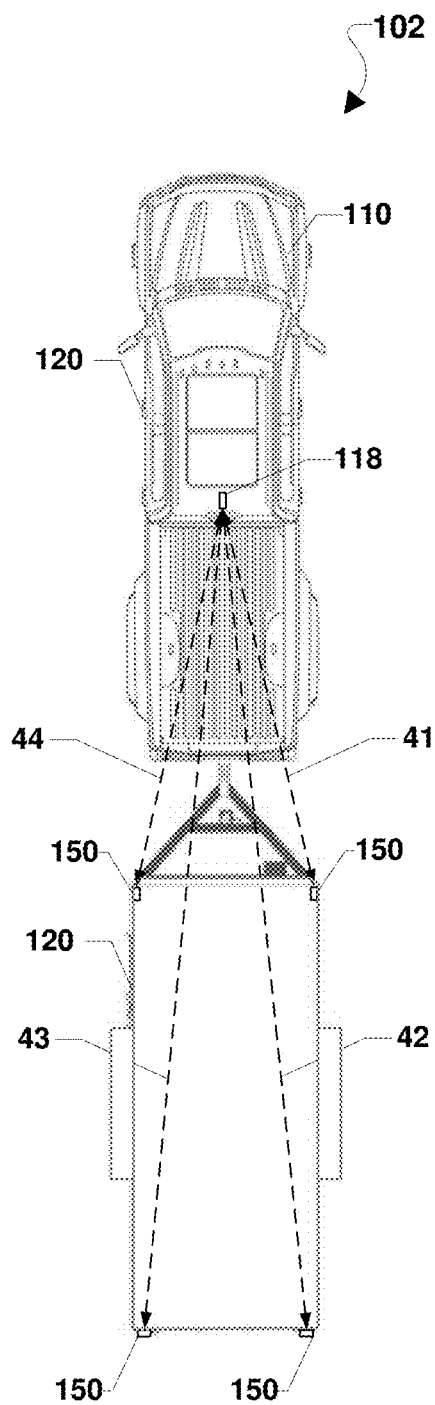
FIGS. 3A and 3B are schematic diagrams illustrating example configurations of a towing vehicle and towed object equipped with remote sensors illustrating distance measurements that may be made in various embodiments.
Figure 3B:
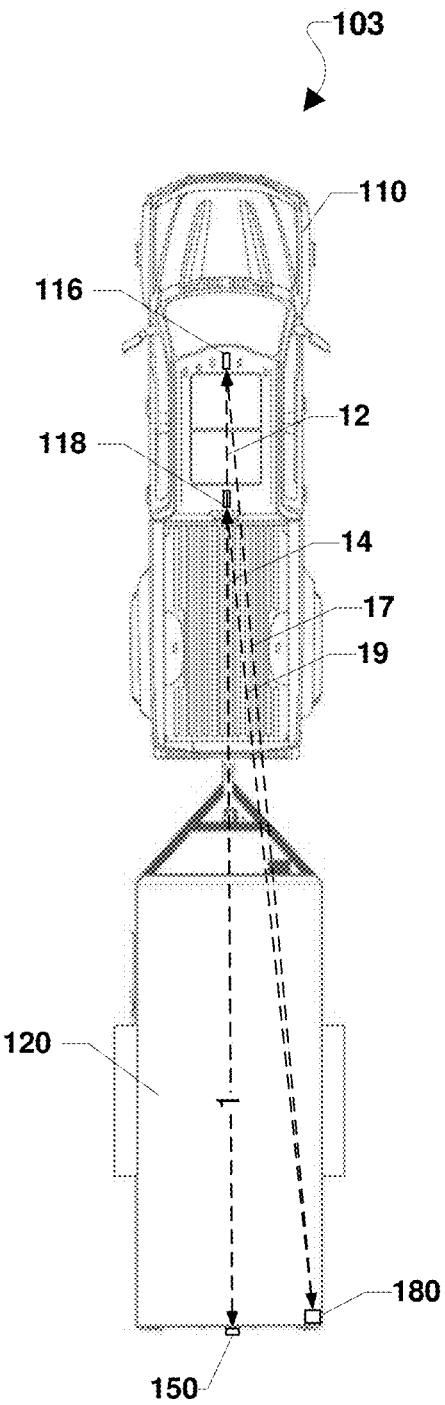

FIGS. 3A and 3B illustrate plan views of additional transportation control system 102, 103 that include a towing vehicle 110 connected to a towed object 120 with different antenna/receiver/sensor configurations in accordance with various embodiments.

With reference to FIG. 3A, the transportation control system 102 includes a towing vehicle 110 that only includes a single antenna 118 coupled to a single intra-vehicle transceiver (not shown separately), but the towed object 120 includes more than one remote sensor 150. In particular, the towed object 120 includes four remote sensor 150. By including more than one remote sensor 150, the intra-vehicle transceiver 114 may be used to exchange or at least receive wireless signals from multiple wireless communication links 41, 42, 43, 44 from each of the respective remote sensors 150. Each of the multiple wireless communication links 41, 42, 43, 44 may be used to determine distances from each of the remote sensors 150, particularly from the respective transceivers therein (e.g., 159), to the intra-vehicle transceiver 114 on the towing vehicle 110. Using multiple remote sensors 150 may also provide redundancies and improve the detection of relative movements of the towed object 120. Any number of remote sensors 150 may be used. While the remote sensors 150 may be disposed almost anywhere on the towed object 120, having the remote sensors 150 located on the back end of the towed object 120 or the peripheral edges may more readily allow a vehicle system (e.g., the V2X system 140, intermediate processing system 170) to determine the furthest end or the outermost dimensions of the towed object 120. BSM messages may not need to define a precise peripheral shape of the towed object 120, only the length and optionally the width.

With reference to FIG. 3B, the transportation control system 103 includes a towing vehicle 110 that once again includes two antennas 116, 118 coupled to intra-vehicle transceivers (not shown separately), but the towed object 120 includes two different kinds of remote sensors 150, 180. For example, the first remote sensor 150 may be a backup camera, while the second remote sensor 180 may be a proximity sensor. Although two different remote sensors are used, distance information may be derived from each and from different points on the towed object 120. Also, even though the second remote sensor 180 provides distance information for only one side of the towed object, since the second remote sensor 180 is disposed on a lateral edge (the right side), the opposite lateral edge (i.e., the left side) may be estimated to be the same lateral distance from a centerline of the towing vehicle 110. The antennas 116, 118 coupled to intra-vehicle transceivers 112, 114 may be used to exchange or at least receive wireless signals from multiple wireless communication links 12, 14, 17, 19 from each of the respective remote sensors 150, 180. The short-range wireless signals may be used for distance calculations for automatically populating BSM messages in accordance with various embodiments.

Figure 4:
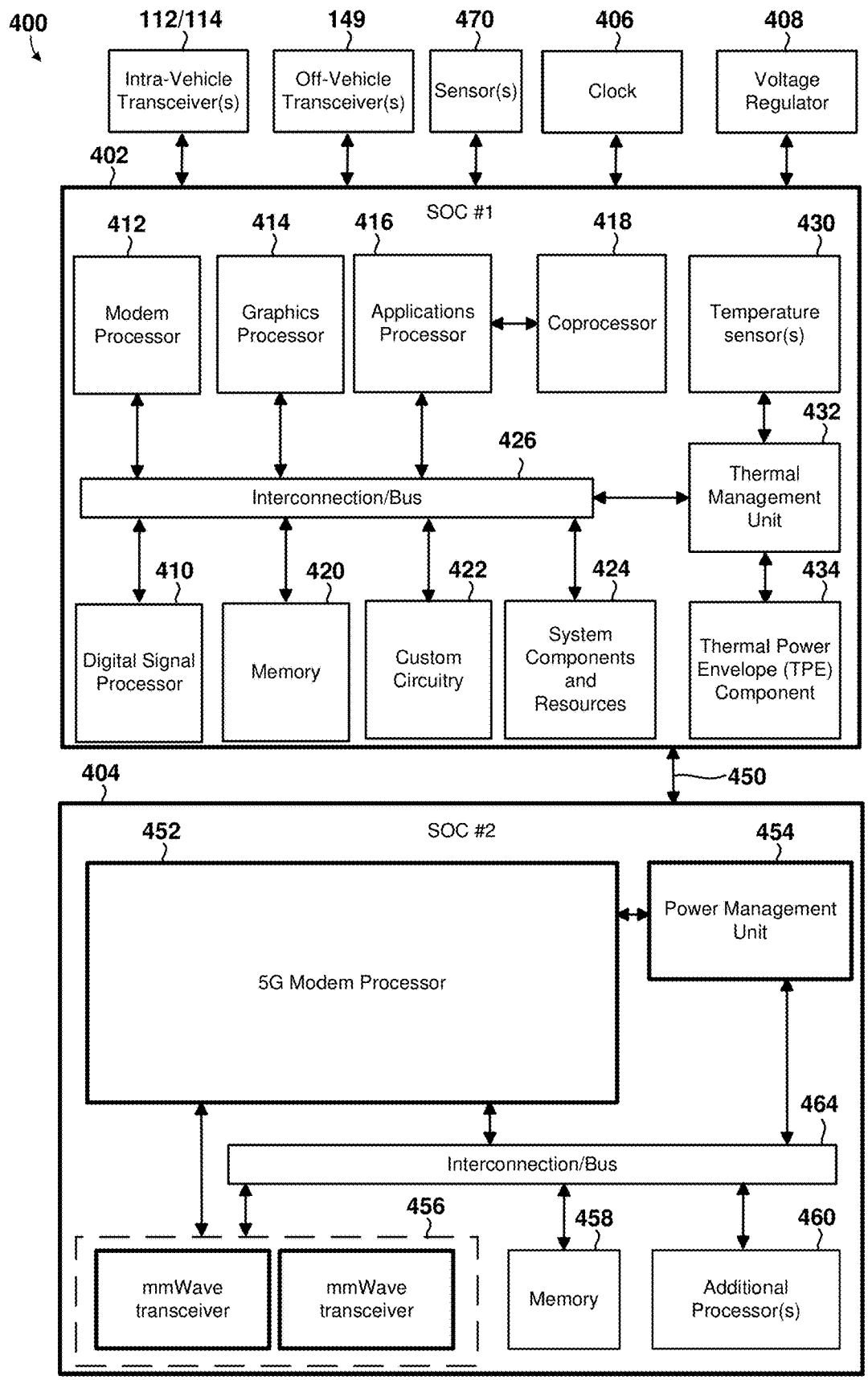
FIG. 4 is a component block diagram illustrating an example system in package suitable for implementing any of various embodiments.

FIG. 4 is a component block diagram illustrating an example processing system 400 which may be included within and configured to perform the functionalities of a V2X 140 and/or an intermediate processing system 170 implementing any of various embodiments.

With reference to FIGS. 1A-4, the illustrated example processing system 400 is in the form of a system in a package (SIP), which includes a two systems-on-chip (SOCs) 402, 404 coupled to a clock 406, a voltage regulator 408, the intra-vehicle transceiver(s) 112, 114, the off-vehicle transceiver(s) 149, and other sensors 470 (e.g., radar, lidar, etc.). In some embodiments, the first SOC 402 operates as central processing unit (CPU) of the wireless device that carries out the instructions of software application programs by performing the arithmetic, logical, control and input/output (I/O) operations specified by the instructions. In some embodiments, the second SOC 404 may operate as a specialized processing unit. For example, the second SOC 404 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 402 may include a digital signal processor (DSP) 410, a modem processor 412, a graphics processor 414, an application processor 416, one or more coprocessors 418 (e.g., vector co-processor) connected to one or more of the processors, memory 420, custom circuitry 422, system components and resources 424, an interconnection/bus module 426, one or more temperature sensors 430, a thermal management unit 432, and a thermal power envelope (TPE) component 434. The second SOC 404 may include a 5G modem processor 452, a power management unit 454, an interconnection/bus module 464, a plurality of mmWave transceivers 456, memory 458, and various additional processors 460, such as an applications processor, packet processor, etc.

Each processor 410, 412, 414, 416, 418, 452, 460 may include one or more cores, and each processor/core may perform operations independent of the other processors/cores. For example, the first SOC 402 may include a processor that executes a first type of operating system (e.g., FreeBSD, LINUX, OS X, etc.) and a processor that executes a second type of operating system (e.g., MICROSOFT WINDOWS 10). In addition, any or all of the processors 410, 412, 414, 416, 418, 452, 460 may be included as part of a processor cluster architecture (e.g., a synchronous processor cluster architecture, an asynchronous or heterogeneous processor cluster architecture, etc.).

The first and second SOC 402,404 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 424 of the first SOC 402 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 424 and/or custom circuitry 422 may also include circuitry to interface with peripheral devices, such as cameras, electronic displays, wireless communication devices, external memory chips, etc.

The first and second SOC 402,404 may communicate via interconnection/bus module 450. The various processors 410, 412, 414, 416, 418, 452, 460 may be interconnected to one or more memory elements 420, system components and resources 424, and custom circuitry 422, and a thermal management unit 432 via an interconnection/bus module 426. Similarly, the processor 452 may be interconnected to the power management unit 454, the mmWave transceivers 456, memory 458, and various additional processors 460 via the interconnection/bus module 464. The interconnection/bus module 426, 450, 464 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 402, 404 may further include an input/output module (not illustrated) for communicating with resources external to the SOC, such as the radio module 153, sensor(s) 150, a clock 406 and a voltage regulator 408. Resources external to the SOC (e.g., clock 406, voltage regulator 408) may be shared by two or more of the internal SOC processors/cores.

In addition to the example processing system 400 discussed above, various embodiments may be implemented in a wide variety of computing systems, which may include a single processor, multiple processors, multicore processors, or any combination thereof.

Figure 5:
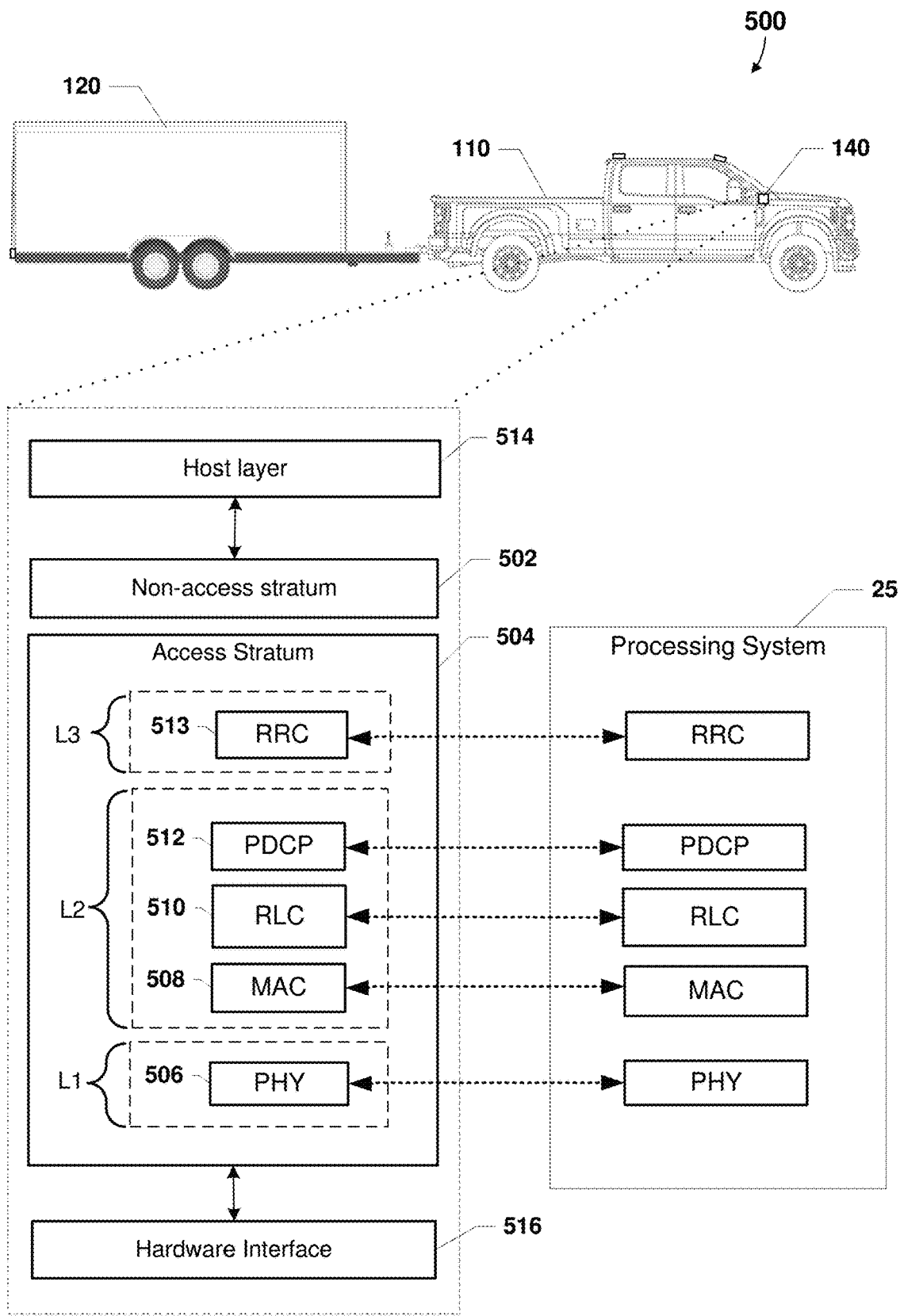
FIG. 5 is a component block diagram illustrating a software architecture including a radio protocol stack for one or more processing systems of a vehicle connected to a towed object suitable for implementing any of various embodiments.

FIG. 5 is a software architecture diagram illustrating a software architecture 500 including a radio protocol stack for the user and control planes in wireless communications suitable for implementing any of various embodiments. With reference to FIGS. 1A-5, the V2X system 140 may implement the software architecture 500 to facilitate communications between the V2X system 140 and a base station 25 of a transportation control system (e.g., 100). In various embodiments, layers in the software architecture 500 may form logical connections with corresponding layers in software of the base station 25. The software architecture 500 may be distributed among one or more processors (e.g., the processors 410, 412, 414, 416, 418, 452, 460).

The software architecture 500 may include a Non-Access Stratum (NAS) 502 and an Access Stratum (AS) 504. The NAS 502 may include functions and protocols to support packet filtering, security management, mobility control, session management, and traffic and signaling between a subscriber identity module (SIM) of the V2X system 140 (e.g., SIM 404) and its vehicle. The AS 504 may include functions and protocols that support communications between a SIM(s) (e.g., SIM(s) 404) and entities of supported access networks (e.g., a base station 25). In particular, the AS 504 may include at least three layers (Layer 1, Layer 2, and Layer 3), each of which may contain various sublayers.

In the user and control planes, Layer 1 (L1) of the AS 504 may be a physical layer (PHY) 506, which may oversee functions that enable transmission and/or reception over the air interface. Examples of such physical layer 506 functions may include cyclic redundancy check (CRC) attachment, coding blocks, scrambling and descrambling, modulation and demodulation, signal measurements, etc. The physical layer may include various logical channels, including a Physical Downlike Control Channel (PDCCH) and a Physical Downlike shared Channel (PDSCH), or sidelink channels such as a Physical Sidelink Control Channel (PSCCH) and a Physical Sidelink Shared Channel (PSSCH).

In the user and control planes, Layer 2 (L2) of the AS 504 may be responsible for the link between the V2X system 140 and the base station 25 over the physical layer 506. In various embodiments, Layer 2 may include a media access control (MAC) sublayer 508, a radio link control (RLC) sublayer 510, and a packet data convergence protocol (PDCP) 512 sublayer, each of which form logical connections terminating at the base station 25.

In the control plane, Layer 3 (L3) of the AS 504 may include a radio resource control (RRC) sublayer 3. While not shown, the software architecture 500 may include additional Layer 3 sublayers, as well as various upper layers above Layer 3. In various embodiments, the RRC sublayer 513 may provide functions including broadcasting system information, paging, and establishing and releasing an RRC signaling connection between the V2X system 140 and the base station 25.

In various embodiments, the PDCP sublayer 512 may provide uplink functions including multiplexing between different radio bearers and logical channels, sequence number addition, handover data handling, integrity protection, ciphering, and header compression. In the downlink, the PDCP sublayer 512 may provide functions that include in-sequence delivery of data packets, duplicate data packet detection, integrity validation, deciphering, and header decompression.

In the uplink, the RLC sublayer 510 may provide segmentation and concatenation of upper layer data packets, retransmission of lost data packets, and Automatic Repeat Request (ARQ). In the downlink, while the RLC sublayer 510 functions may include reordering of data packets to compensate for out-of-order reception, reassembly of upper layer data packets, and ARQ.

In the uplink, MAC sublayer 508 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 500 may provide functions to transmit data through physical media, the software architecture 500 may further include at least one host layer 514 to provide data transfer services to various applications in the V2X system 140. In some embodiments, application-specific functions provided by the at least one host layer 514 may provide an interface between the software architecture and the general purpose processor (e.g., 141).

In other embodiments, the software architecture 500 may include one or more higher logical layer (e.g., transport, session, presentation, application, etc.) that provide host layer functions. For example, in some embodiments, the software architecture 500 may include a network layer (e.g., Internet Protocol (IP) layer) in which a logical connection terminates at a packet data network (PDN) gateway (PGW). In some embodiments, the software architecture 500 may include an application layer in which a logical connection terminates at another device (e.g., end user device, server, etc.). In some embodiments, the software architecture 500 may further include in the AS 504 a hardware interface 516 between the physical layer 506 and the communication hardware (e.g., one or more radio frequency (RF) transceivers).

Figure 6A:
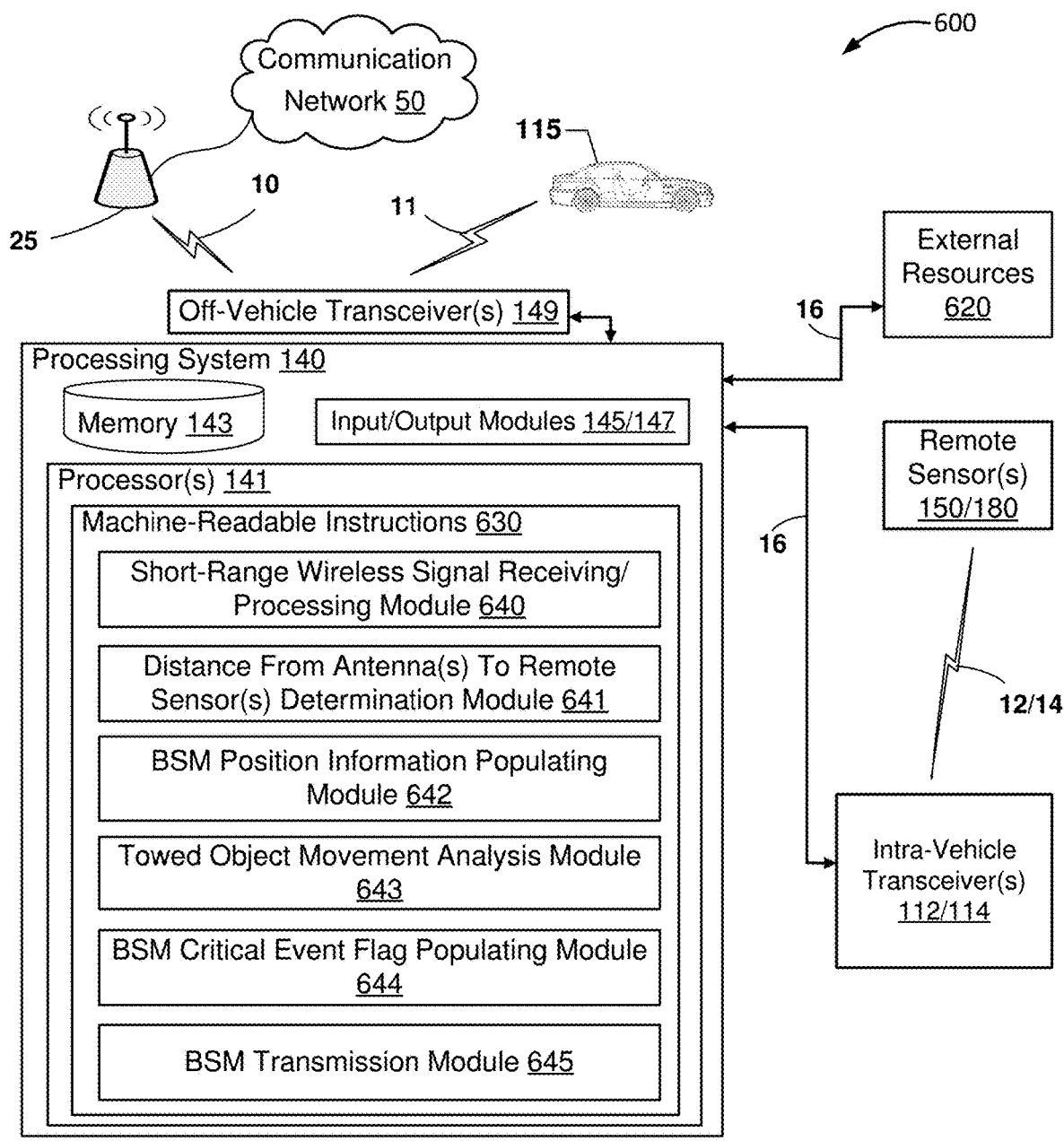
FIGS. 6A and 6B are component block diagrams illustrating systems configured for automatically populating a BSM with vehicle and towed object position and combined length in accordance with various embodiments.

FIG. 6A is a component block diagram illustrating a system 600 configured for automatically populating a BSM with vehicle and towed object position and combined length in accordance with various embodiments. With reference to FIGS. 1A-6A, the system 600 may include elements of the transportation control system 100, described with regard to FIG. 1A, such as the V2X system 140. The system 600 may also include one or more remote sensors 150/180, which may be part of a transportation control system configured to help the V2X system 140 measure towed object dimensions and populate BSMs with accurate vehicle position/location information.

The V2X system 140 may also include memory 143 (i.e., electronic storage), one or more processors 141, and/or other components such as input/output modules 145, 147. The V2X system 140 may also include communication lines or ports, to enable the exchange of information with remote equipment and/or computing devices, such as external resources 620. Using communication lines through the intra-vehicle transceiver(s) 112/114, the processor(s) 141 may exchange information or at least receive wireless signals over wireless communication links 12/14 for measuring distances from one or more remote sensors 150/180. In addition, using communication lines through the one or more off-vehicle transceivers 149, the processing system may exchange information with a communication network 50 and/or other remote computing platforms via a base station 25 and a wireless communication link 10, as well as one or more additional vehicle(s) 115 nearby through sidelink communications via a wireless communication link 11.

Illustration of the V2X system 140 in FIG. 6A is not intended to be limiting. The V2X system 140 may include a plurality of hardware, software, and/or firmware components operating together to provide the functionality attributed herein to the V2X system 140.

The memory 143 may be any non-transitory computer readable medium that electronically stores information. The electronic storage media of memory 143 may include one or both of system storage that is provided integrally (i.e., substantially non-removable) with the V2X system 140 and/or removable storage that is removably connectable thereto. For example, a port (e.g., a Universal Serial Bus (USB) port, a FireWire port, etc.) or a drive (e.g., a disk drive, etc.). The memory 143 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory 143 may include one or more virtual storage resources (e.g., cloud storage, a virtual private network, and/or other virtual storage resources). The memory 143 may store software algorithms, information determined by processor(s) 141, information received from the V2X system 140 that enables the V2X system 140 to function as described herein.

The processor(s) 141 may be configured to provide information processing capabilities in the V2X system 140. As such, the processor(s) 141 may include one or more of a digital processor, an analog processor, a digital circuit designed to process information, an analog circuit designed to process information, a state machine, and/or other mechanisms for electronically processing information. Although the processor(s) 141 is/are shown in FIG. 6A as a single entity, this is for illustrative purposes only. In some implementations, the processor(s) 141 may include a plurality of processing units. These processing units may be physically located within the same device, or processor(s) 141 may represent processing functionality of a plurality of devices, remote and/or local to one another, operating in coordination.

The V2X system 140 may be configured by machine-readable instructions 630, which may include one or more instruction modules. The instruction modules may include computer program modules. In particular, the instruction modules may include one or more of a short-range wireless signal receiving/processing module 640, a distance from antenna(s) to remote sensor(s) determination module 641, a BSM position information populating module 642, a towed object movement analysis module 643, a BSM critical event flag populating module 644, a BSM transmission module 645, and/or other instruction modules.

The short-range wireless signal receiving/processing module 640 may be configured to receive and/or process the short-range wireless signals (e.g., 12, 14, 17, 19, 41, 42, 43, 44) from the one or more remote sensors (e.g., 150, 180). In some embodiments, the short-range wireless signals may be at least one of Wi-Fi, Bluetooth, or UWB signals.

As a non-limiting example, means for implementing the machine-readable instructions 635 of the short-range wireless signal receiving/processing module 640 may include a processor (e.g., 141, 410, 412, 414, 416, 418, 452, 460) of a processing device (e.g., 140) that may use the memory (e.g., 143), the external resources 620, and/or the signal information received from the intra-vehicle transceiver(s) (e.g., 112/114).

The distance from antenna(s) to remote sensor(s) determination module 641 may be configured to determine a distance from antennas 116, 118 coupled to a receiver (e.g., one or both of the intra-vehicle transceiver(s) 112/114) in the towing vehicle (e.g., 110) to a remote sensor (e.g., 150) on the towed object (e.g., 120) by processing short-range wireless signals (e.g., 12, 14, 17, 19, 41, 42, 43, 44) received from the remote sensor(s) (e.g., 150, 180). Using ranging measurement techniques associated with Wi-Fi, Bluetooth, and/or UWB, the distance from antenna(s) to remote sensor(s) determination module 641 may determine a distance traveled by the short-range wireless signals. In some embodiments, the remote sensor may be a camera and the short-range wireless signals may encode image data from the camera. For example, the short-range wireless signals may not only be measured to determine the distance from the antenna(s) to the remote sensor, but may also carry encoded data that may be converted into pictures and/or streaming video captured by the camera. Otherwise, regardless of what type of sensor the remote sensor is, the short-range wireless signals may encode data from the remote sensor in addition to being measured to determine the distance from the antenna(s) to the remote sensor.

As a non-limiting example, means for implementing the machine-readable instructions 635 of the distance from antenna(s) to remote sensor(s) determination module 641 may include a processor (e.g., 141, 410, 412, 414, 416, 418.452, 460) of a processing device (e.g., 140) that may use the memory (e.g., 143), and the external resources 620.

The BSM position information populating module 642 may be configured to populate a Basic Safety Message (BSM) with a position and combined length of the vehicle and the towed object based in part on the distance(s) determined by the distance from antenna(s) to remote sensor(s) determination module 641. In some embodiments, the position and combined length populated in the BSM by the BSM position information populating module 642 may include a total combined length of the towing vehicle (e.g., 110) and the towed object (e.g., 120), including any hitch-space there between. In some embodiments, the position and combined length populated in the BSM by the BSM position information populating module 642 may additionally include a width of one or both of the towing vehicle 110 and the towed object 120.

As a non-limiting example, means for implementing the machine-readable instructions 635 of the BSM position information populating module 642 may include a processor (e.g., 141, 410, 412, 414, 416, 418, 452, 460) of a processing device (e.g., 140) that may use the memory (e.g., 143), the external resources 620, and/or the signal information received from the intra-vehicle transceiver(s) (e.g., 112/114).

The towed object movement analysis module 643 may be configured to process the short-range wireless signals (e.g., 12, 14, 17, 19, 41, 42, 43, 44) received from the remote sensor (e.g., 150, 180) to obtain information regarding movement of the towed object (e.g., 120) relative to the towing vehicle (e.g., 110). In some embodiments, the movement of the towed object may be detected from changes in the distances determined by the distance from antenna(s) to remote sensor(s) determination module 641. Detected changes in the distances may reflect movement of the towed object relative to the towing vehicle 110. In some embodiments, the towed object movement analysis module 643 may be configured to process the short-range wireless signals to determine whether movement of the towed object relative to the antenna(s) in the vehicle satisfies a dangerous or critical vehicle movement criterion. If detected changes in the distances satisfy one or more criteria indicative or associated with certain dangerous conditions, such as swerving or fishtailing of the towed object, additional measures may be taken.

As a As a non-limiting example, means for implementing the machine-readable instructions 635 of the towed object movement analysis module 643 may include a processor (e.g., 141, 410, 412, 414, 416, 418, 452, 460) of a processing device (e.g., 140) that may use the memory (e.g., 143), the external resources 620, and/or the signal information received from the intra-vehicle transceiver(s) (e.g., 112/114).

The BSM critical event flag populating module 644 may be configured to populate a critical event flag in the BSM in response to the towed object movement analysis module 643 determining that the movement of the towed object relative to the antenna(s) in the vehicle satisfies a dangerous or critical vehicle movement criterion. For example, changes in the distance measurements may satisfy a criterion indicating swerving or lateral movement of the rear end of the towed object that exceeds a predetermined swerving threshold amount of movement. As another example, the movement pattern may satisfy a criterion indicating a fishtailing movement of the towed object that either continues for a predetermined amount of time (e.g., more than 10 seconds) or swings back and forth more than a predetermined fishtailing threshold amount of movement, which may be smaller than the predetermined swerving threshold.

As a non-limiting example, means for implementing the machine-readable instructions 635 of the BSM critical event flag populating module 644 may include a processor (e.g., 141, 410, 412, 414, 416, 418, 452, 460) of a processing device (e.g., 140) that may use the memory (e.g., 143), the external resources 620, and/or the signal information received from the intra-vehicle transceiver(s) (e.g., 112/114).

The BSM transmission module 645 may be configured to transmit the BSM populated by the BSM position information populating module 642 and possibly the BSM critical event flag populating module 644. In some embodiments, the BSM transmission module 645 may transmit the populated BSM using the off-vehicle transceiver(s) 149 to one or both of the base station 25 and the additional vehicle(s) 115.

As a non-limiting example, means for implementing the machine-readable instructions 635 of the BSM transmission module 645 may include a processor (e.g., 141, 171, 410, 412, 414, 416.418, 452, 460) of a processing device (e.g., 140, 170) that may use the memory 143, external resources 620, and/or the off-vehicle transceiver(s) 149.

The processor(s) 141 may be configured to execute modules 640, 641, 642, 643, 644, and/or 645, and/or other modules. Processor(s) 141 may be configured to execute modules 640, 641, 642, 643, 644, and/or 645, and/or other modules by software; hardware; firmware; some combination of software, hardware, and/or firmware; and/or other mechanisms for configuring processing capabilities on processor(s) 141. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 640, 641, 642, 643, 644, and/or 645 described below is for illustrative purposes, and is not intended to be limiting, as any of modules 640, 641, 642, 643, 644, and/or 645 may provide more or less functionality than is described. For example, one or more of modules 640, 641, 642, 643, 644, and/or 645 may be eliminated, and some or all of its functionality may be provided by other ones of modules 640, 641, 642, 643, 644, and/or 645. As another example, processor(s) 141 may be configured to execute one or more additional modules that may perform some or all of the functionality attributed below to one of modules 640, 641, 642, 643, 644, and/or 645.

Figure 6B:
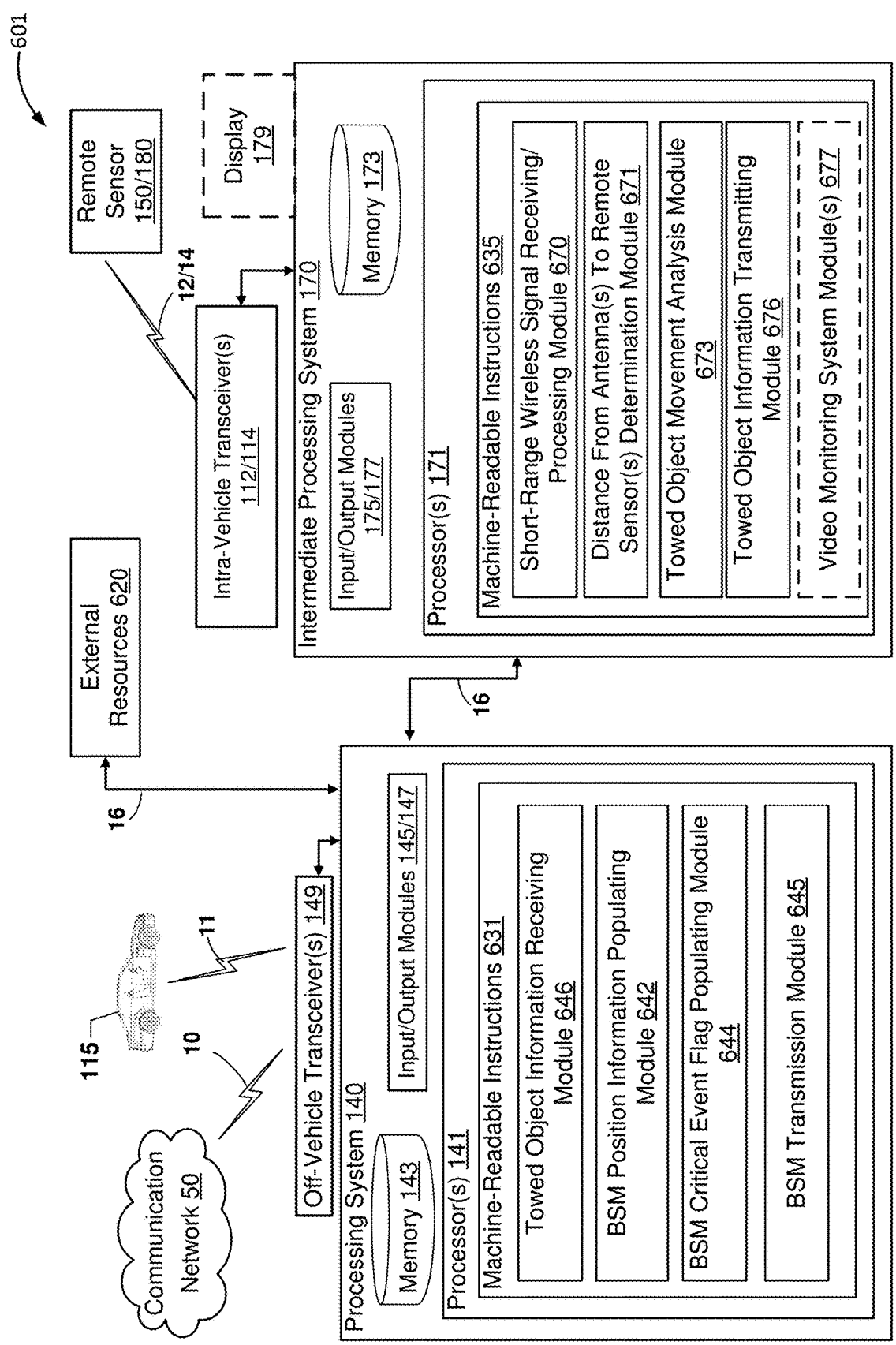

FIG. 6B is a component block diagram illustrating a system 601 configured for automatically populating a BSM with vehicle and towed object position and combined length in accordance with various embodiments. With reference to FIGS. 1A-6B, the system 601 may include elements of the transportation control system 101, described with regard to FIG. 1B, such as the V2X system 140 and the intermediate processing system 170. The system 601 may also include one or more remote sensors 150/180, which may be part of a transportation control system configured to help the V2X system 140 and the intermediate processing system 170 to measure towed object dimensions and populate BSMs with accurate vehicle position/location information.

The V2X system 140 may include the features and functionality described with regard to the system 600, such as the processor(s) 141. In addition, the V2X system 140 in the system 601 may be configured by machine-readable instructions 631, which may include one or more additional or different instruction modules. The instruction modules may include computer program modules. In particular, the instruction modules may include one or more of a towed object information receiving module 646, the BSM position information populating module 642, the BSM critical event flag populating module 644, the BSM transmission module 645, and/or other instruction modules.

The towed object information receiving module 646 may be configured to receive information related to the towed object (e.g., 120) from a processor 151 of the intermediate processing system 170. In some embodiments, the received towed object information may include length information, such as the total length from a front of the towing vehicle (e.g., 110) to the rear of the towed object (e.g., 120). In addition, the received towed object information may include width information, such as a maximum width of the towed object, or more detailed dimensional information about the towed object. Further, the received towed object information may include movement information regarding the towed object. The movement information my indicate how or whether the towed object is moving relative to the towing vehicle. In addition, movement information may indicate how or whether the towed object is moving in a dangerous way that matches a predefined set of dangerous vehicle movement patterns.

As a non-limiting example, means for implementing the machine-readable instructions 635 of the short-range wireless signal receiving/processing module 640 may include a processor (e.g., 141, 410, 412, 414, 416, 418, 452, 460) of a processing device (e.g., 140) that may use the memory (e.g., 143), the external resources 620, and/or the signal information received from the intra-vehicle transceiver(s) (e.g., 112/114).

The intermediate processing system 170 may operate like a video monitoring system in a vehicle, such as may be used to monitor backup camera video. The intermediate processing system 170 may include memory 173 (i.e., electronic storage), one or more processors 171, input/output modules 175/175, and/or other components such as an optional display 179. The intermediate processing system 170 may also include communication lines or ports, such as for connecting to the intra-vehicle transceiver(s) 112/114 to enable the exchange of information with one or more remote sensors 150/180. Illustration of the intermediate processing system 170 in FIG. 6B is not intended to be limiting. The intermediate processing system 170 may include a plurality of hardware, software, and/or firmware components operating together to provide the functionality attributed herein to the intermediate processing system 170.

The intermediate processing system 170 may include one or more processors configured to execute computer program modules similar to those in the machine-readable instructions 630 or 631 of the processor(s) 141 in the V2X system 140 described above. Similarly, a given intermediate processing system 170 may include one or more processors configured to execute computer program modules similar to those in the machine-readable instructions 630, 631 of the V2X system 140 described above. In addition, the intermediate processing system 170 may be configured by machine-readable instructions 635, which may include one or more of its own instruction modules. The instruction modules may include one or more of a short-range wireless signal receiving/processing module 670, a distance from antenna(s) to remote sensor(s) determination module 671, a towed object movement analysis module 673, a towed object information transmitting module 676, a video monitoring system module 677, and/or other instruction modules.

The short-range wireless signal receiving/processing module 670 may operate in the same or analogous way to the short-range wireless signal receiving/processing module 640 of the machine-readable instructions 630 of the processor 141 described above with regard to the system 600. Thus, the short-range wireless signal receiving/processing module 670 may receive and process the short-range wireless signals (e.g., 12, 14, 17, 19, 41, 42, 43, 44) for the remote sensor (e.g., 150, 180). For example, where the intermediate processing system 170 is a video monitoring system of the vehicle, the short-range wireless signal receiving/processing module 670 may receive and/or process camera images and/or streaming video. Similarly, the distance from antenna(s) to remote sensor(s) determination module 671 and the towed object movement analysis module 673 may operate in the same or analogous way to the distance from antenna(s) to remote sensor(s) determination module 641 and the towed object movement analysis module 643, respectively, of the machine-readable instructions 630 of the processor 141 described above with regard to the system 600.

The towed object information transmitting module 676 may transmit the information related to the towed object (e.g., 120) received by the towed object information receiving module 646, described above. For example, the transmitted towed object information may include length information, such as the total length from a front of the towing vehicle (e.g., 110) to the rear of the towed object (e.g., 120). In addition, the transmitted towed object information may include width information, such as a maximum width of the towed object, or more detailed dimensional information about the towed object. Further, the transmitted towed object information may include movement information regarding the towed object. The movement information my indicate how or whether the towed object is moving relative to the towing vehicle. In addition, movement information may indicate how or whether the towed object is moving in a dangerous way that matches a predefined set of dangerous vehicle movement patterns.

The towed object information transmitting module 676 may provide the V2X system 140 with determined distance information related to the towed object in a format that enables a BSM to include such information. The V2X system 140 may automatically populate fields in a Basic Safety Messages with information regarding locations and combined length of the vehicle and the towed object.

As a non-limiting example, means for implementing the machine-readable instructions 635 of the towed object information transmitting module 676 may include a processor (e.g., 141, 171 410, 412, 414, 416, 418, 452, 460) of a processing device (e.g., 170) that may use the memory (e.g., 173), and/or the input/output modules 175/177, which may include a communication link 16 to the V2X system 140.

The optional video monitoring system module 677 may be included when the intermediate processing system 170 is a video monitoring system or part thereof. The video monitoring system module 677 may provide functionality such as video display (e.g., output on the display 179) and other features typically included with backup camera systems or the like.

FIGS. 7A-D illustrates operations of methods 700, 701, 702, 703 for automatically populating a BSM with vehicle and towed object position and combined length executed by a processor of a processing system in accordance with various embodiments. In some embodiments, the methods 700, 701, 702, 703 may be accomplished with one or more additional operations not described, and/or without one or more of the operations discussed. With reference to FIGS. 1A-7A, the operations of the methods 700, 701, 702, 703 may be implemented in one or more processors (e.g., a digital processor, an analog processor, a digital circuit designed to process information, an analog circuit designed to process information, a state machine, and/or other mechanisms for electronically processing information) in response to instructions stored electronically on an electronic storage medium of a processing system. The one or more processors may include one or more devices configured through hardware, firmware, and/or software to be specifically designed for execution of one or more of the operations of the methods 700, 701, 702, 703. For example, the operations of the methods 700, 701, 702, 703 may be performed by a processor (e.g., 141, 171, 410, 412, 414, 416, 418, 452, 460) of a processing system (e.g., 130).

Figure 7A:
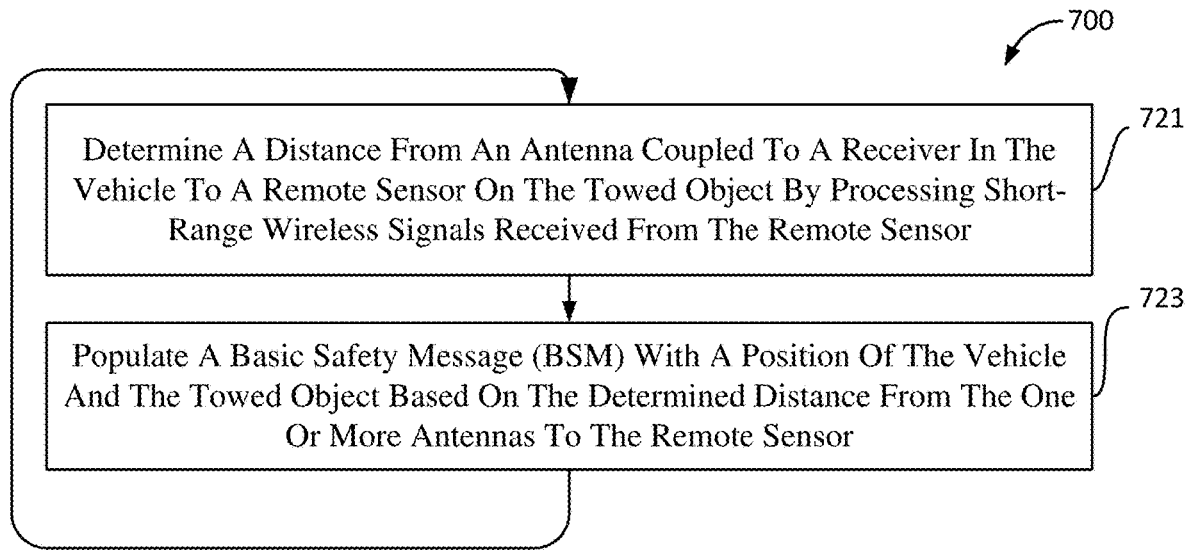
FIGS. 7A-7D are process flow diagrams of methods for automatically populating a BSM with vehicle and towed object position and combined length executed by one or more processing systems of a vehicle connected to a towed object according to various embodiments.

FIG. 7A illustrates the method 700. In block 721, the processor of a processing system may perform operations including determining a distance from a antenna(s) in the vehicle to a remote sensor on the towed object by processing short-range wireless signals received from the remote sensor. In block 721, the processor of the processing system may use the distance from antenna(s) to remote sensor(s) determination module (e.g., 641). For example, the processor may determine one or more distances associated with the towed object, such as it length, width, and/or position relative to the towing vehicle, as described above. In some embodiments, means for performing the operations of block 721 may include a processor (e.g., 141, 171, 410, 412, 414, 416, 418, 452, 460) of a processing device (e.g., 140, 170) that may use the memory 143, 173, external resources 620, and/or the intra-vehicle transceiver(s) 112/114. In some embodiments, the short-range wireless signals received in block 721 may be or include Wi-Fi, Bluetooth, or UWB signals. In some embodiments, the short-range wireless signals received in block 721 may encode data from the remote sensor. In some embodiments, the remote sensor may be a camera. Thus, the short-range wireless signals may encode image data from the camera.

In block 723, the processor of a processing system may perform operations including populating a BSM with a position of the vehicle and the towed object based on the determined distance from the antenna(s) to the remote sensor. In block 723, the processor of the processing system may use the BSM position and combined length populating module (e.g., 642). In some embodiments, means for performing the operations of block 723 may include a processor (e.g., 141, 171, 410, 412, 414, 416, 418, 452, 460) of a processing device (e.g., 140, 170) that may use the memory 143, 173, and/or the external resources 620.

In some embodiments, the processor may repeat any or all of the operations in blocks 721 and 723 to repeatedly measure the distance to the back end of the towed vehicle, which may be useful for detecting dangerous movement conditions, such as swerve or fishtailing as described.

Figure 7B:
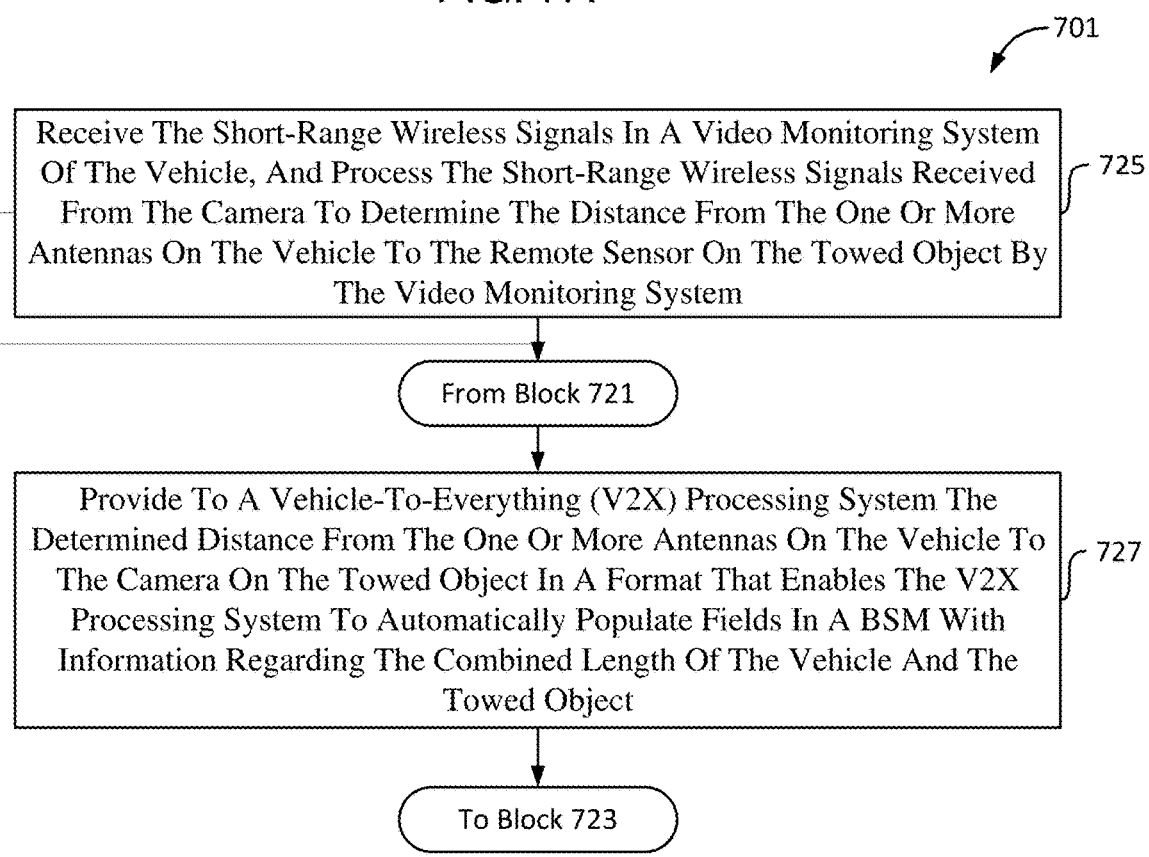

FIG. 7B illustrates method 701 that may be performed with or as an enhancement to the method 700 for automatically populating a BSM with vehicle and towed object position and combined length.

In block 725, the processor may receive the short-range wireless signals in a video monitoring system of the vehicle. By using a video monitoring system, the receipt and processing of the short-range wireless signals from the camera, in block 721, to determine the distance from the antenna(s) in the vehicle to the remote sensor on the towed object may be performed by the video monitoring system. In block 725, the processor of the processing system may use the short-range wireless signal receiving/processing module (e.g., 670). In some embodiments, means for performing the operations of block 725 may include a processor (e.g., 141, 171, 410, 412, 414, 416, 418, 452, 460) of a processing device (e.g., 140, 170) that may use the memory 143, 173, the external resources 620, and or the intra-vehicle transceiver(s) 112/114.

In block 727, the processor may provide to a V2X processing system the determined distance from the antenna(s) in the vehicle to the camera on the towed object in a format that enables the V2X processing system to automatically populate fields in a Basic Safety Messages with information regarding locations or length of the vehicle and the towed object. In block 727, the processor of the processing system may use the towed object information transmitting module (e.g., 676). In some embodiments, means for performing the operations of block 727 may include a processor (e.g., 141, 171, 410, 412, 414, 416, 418, 452, 460) of a processing device (e.g., 140, 170) that may use the memory 143, 173, and/or the external resources 620.

Following the operations in block 727, the processor may perform the operations in block 723 and thereafter repeat to the operations in block 721, 723, 725, and 727 to repeatedly or continuously populate BSMs with towing vehicle and towed object position and combined length.

Figure 7C:
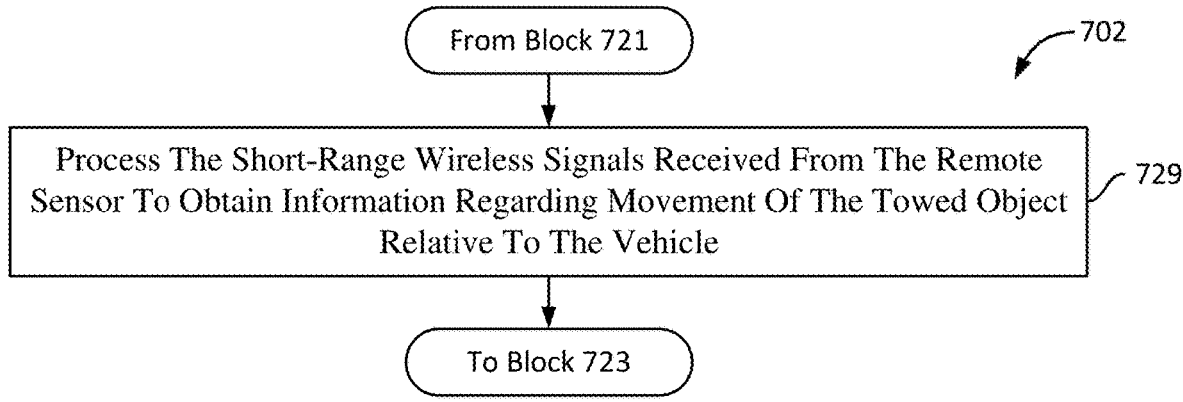

FIG. 7C illustrates method 702 that may be performed with or as an enhancement to the method 70) for automatically populating a BSM with vehicle and towed object position and combined length.

In block 729, following the operations in block 721, the processor may process the short-range wireless signals received from the remote sensor to obtain information regarding movement of the towed object relative to the vehicle. In block 729, the processor of the processing system may use the towed object movement analysis module (e.g., 643). In some embodiments, means for performing the operations of block 729 may include a processor (e.g., 141, 171, 410, 412, 414, 416, 418, 452, 460) of a processing device (e.g., 140, 170) that may use the memory 143, 173, and/or the external resources 620.

Following the operations in block 729, the processor may perform the operations in block 723 and thereafter repeat to the operations in block 721, 723, and 729 to repeatedly or continuously populate BSMs with towing vehicle and towed object position and combined length.

Figure 7D:
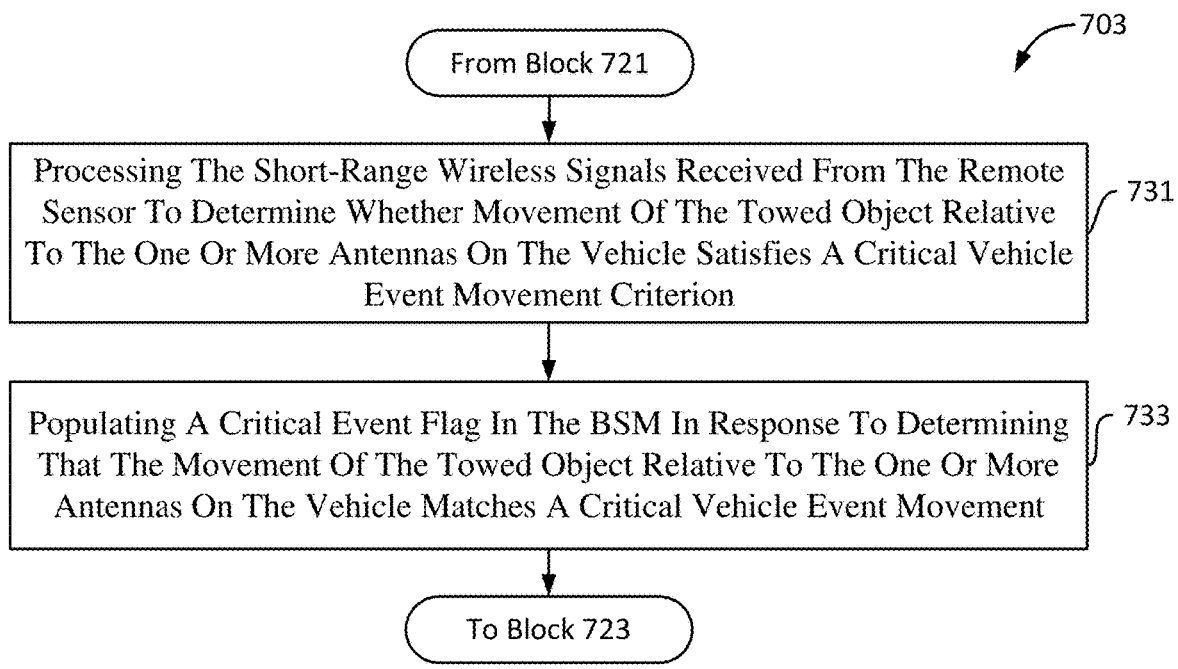

FIG. 7D illustrates method 703 that may be performed with or as an enhancement to the method 700 for automatically populating a BSM with vehicle and towed object position and combined length.

In block 731, following the operations in block 721, the processor may process the short-range wireless signals received from the remote sensor to determine whether movement of the towed object relative to the antenna(s) in the vehicle satisfies a dangerous or critical vehicle movement criterion. In block 731, the processor of the processing system may use the towed object movement analysis module (e.g., 643). In some embodiments, means for performing the operations of block 731 may include a processor (e.g., 141, 171, 410, 412, 414, 416, 418, 452, 460) of a processing device (e.g., 140, 170) that may use the memory 143, 173, and/or the external resources 620.

In block 733, the processor of a processing system may perform operations including an indication of a critical event in safety messages, such as populating a critical event flag in BSMs, in response to determining that the movement of the towed object relative to the antenna(s) in the vehicle satisfies a dangerous or critical vehicle movement criterion. In block 733, the processor of the processing system may use the BSM critical event flag populating module (e.g., 644). In some embodiments, means for performing the operations of block 733 may include a processor (e.g., 141, 171, 410, 412, 414, 416, 418, 452, 460) of a processing device (e.g., 140, 170) that may use the memory 143, 173, and/or the external resources 620.

Following the operations in block 733, the processor may perform the operations in block 723 and thereafter repeat to the operations in block 721, 723, 731 and 733 to repeatedly or continuously populate BSMs with towing vehicle and towed object position and length information.

Figure 8:
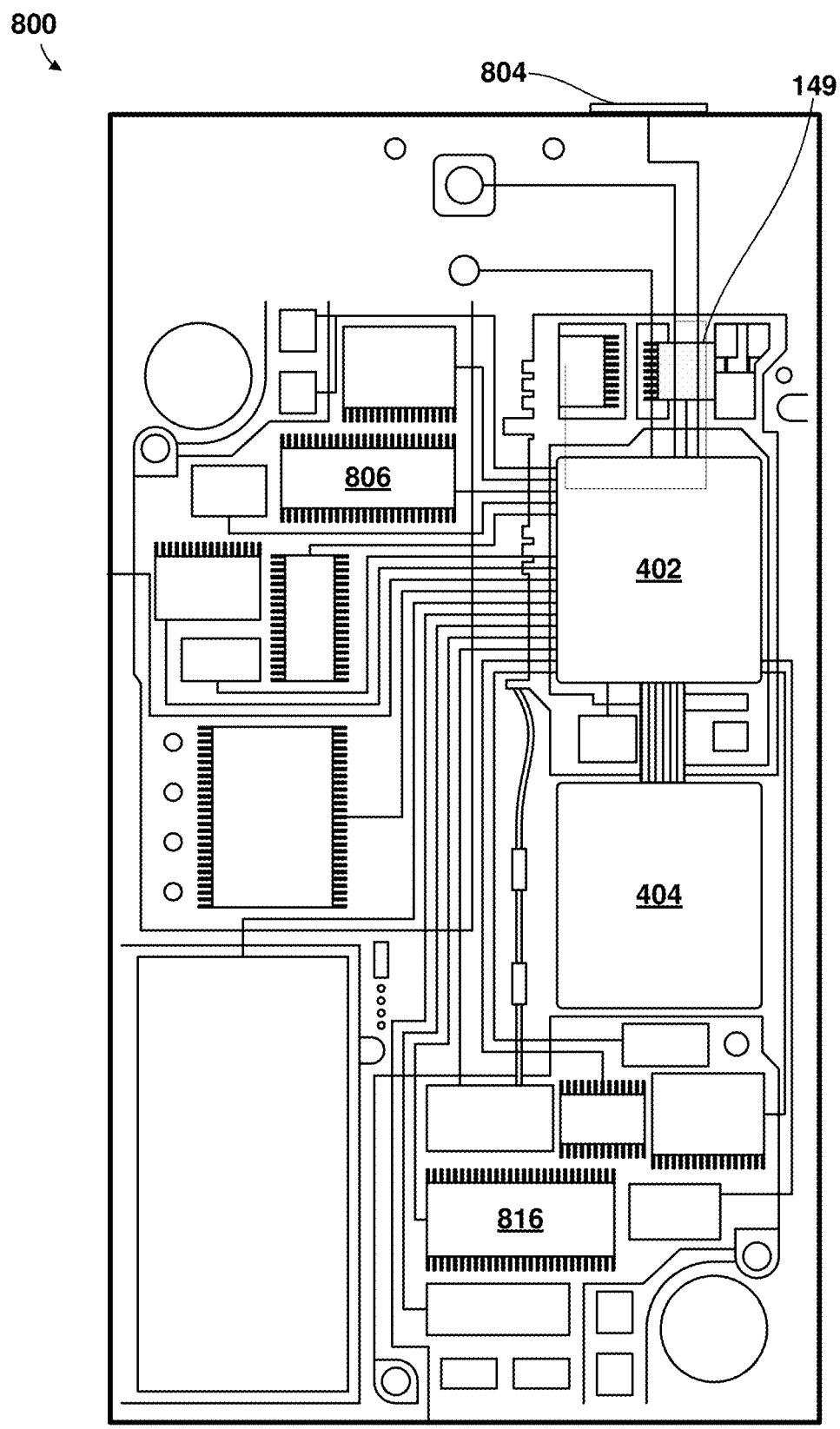
FIG. 8 is a component block diagram of processing system suitable for use with various embodiments.

The various aspects (including, but not limited to, embodiments discussed above with reference to FIGS. 1A-7D) may be implemented on a variety of processing system, an example of which is illustrated in FIG. 8 in the form of a computing device suitable for use in a vehicle. With reference to FIGS. 1A-8, the processing system 800 may include a first SoC 402 (e.g., a SoC-CPU) coupled to a second SoC 404 (e.g., a 5G capable SoC) and a third SoC 806 (e.g., a C-V2X SoC configured for managing V2V, V2I, and V2P communications over D2D links, such as D2D links establish in the dedicated ITS 5.9 GHz spectrum communications). The first, second, and/or third SoCs 402, 404, and 806 may be coupled to internal memory 816 and a radio module 149 coupled to an antenna 804. Additionally, the processing system 800 may include off-vehicle transceiver(s) 149 (e.g., a wireless data link and/or cellular transceiver, etc.) coupled to one or more processors in the first, second, and/or third SoCs 402, 404, and 806. The off-vehicle transceiver(s) 149 may be connected to an antenna interface 804 for connecting to a vehicle antenna for sending and receiving electromagnetic radiation.

Figure 9:
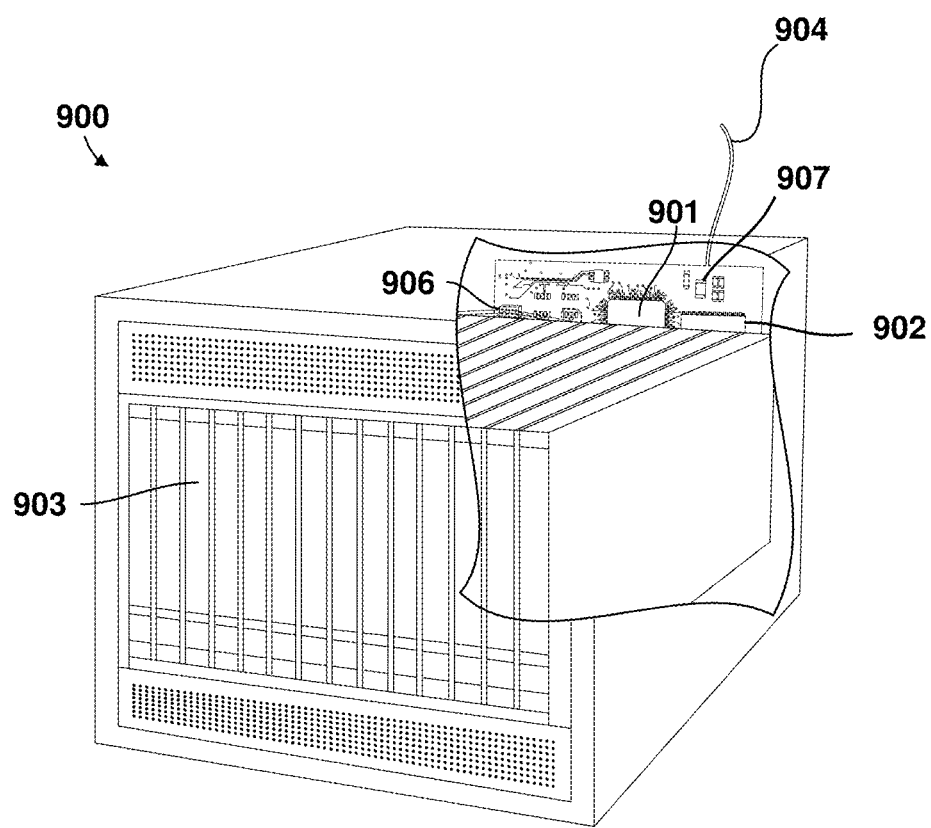
FIG. 9 is a component block diagram of a base station server computing device suitable for use with various embodiments.

Various embodiments (including, but not limited to, embodiments discussed above with reference to FIGS. 1A-8) may be implemented on a variety of vehicle computing systems, an example of which is illustrated in FIG. 9. With reference to FIGS. 1A-9, a vehicle computing system 900 may include a processor 901 coupled to volatile memory 902 and a large capacity nonvolatile memory, such as a disk drive 903. The vehicle computing system 900 may also include a peripheral memory access device such as a floppy disc drive, compact disc (CD) or digital video disc (DVD) drive 906 coupled to the processor 901. The vehicle computing system 900 processor 901 may be coupled to communication ports 907 (or interfaces) coupled to a network 904 for exchanging data and commands with a radio module (not shown). The vehicle computing system 900 may include additional access ports, such as USB, Firewire, Thunderbolt, and the like for coupling to peripherals, external memory, or other devices.

Implementation examples are described in the following paragraphs. While some of the following implementation examples are described in terms of example methods, further example implementations may include: the example methods discussed in the following paragraphs implemented by a vehicle computing system processor that may be an onboard unit that may be independent of or implemented as part of V2X onboard equipment and includes a processor configured with processor-executable instructions to perform operations of the methods of the following implementation examples; the example methods discussed in the following paragraphs implemented by a vehicle computing system including means for performing functions of the methods of the following implementation examples; and the example methods discussed in the following paragraphs may be implemented as a non-transitory processor-readable storage medium having stored thereon processor-executable instructions configured to cause a vehicle computing system processor to perform the operations of the methods of the following implementation examples.

Example 1. A method performed by a processing system of a vehicle connected to a towed object, including determining a distance from one or more antennas coupled to a receiver in the vehicle to a remote sensor on the towed object by processing short-range wireless signals received from the remote sensor; and populating a safety message with a position of the vehicle and the towed object based on the determined distance from the one or more antennas to the remote sensor.

Example 2. The method example 1, in which the safety messages are one of a Basic Safety Message (BSM), a "Cooperative Awareness Message" (CAM), or a "Decentralized Environmental Notification Message" (DENM).

Example 3. The method of either of examples 1 or 2, in which the short-range wireless signals are at least one of Wi-Fi, Bluetooth, or ultra-wide band signals.

Example 4. The method of any one of examples 1-3, in which the remote sensor is a camera, and the short-range wireless signals encode image data from the camera.

Example 5. The method of any one of examples 1-4, further including receiving the short-range wireless signals in a video monitoring system of the vehicle, wherein processing the short-range wireless signals received from the camera to determine the distance from one or more antennas coupled to the receiver in the vehicle to the remote sensor on the towed object is performed by the video monitoring system; and providing to a vehicle-to-everything (V2X) processing system the determined distance from the receiver in the vehicle to the camera on the towed object in a format that enables the V2X processing system to automatically populate fields in safety messages with information regarding locations or length of the vehicle and the towed object.

Example 6. The method of any one of examples 1-5, in which the short-range wireless signals encode data from the remote sensor.

Example 7. The method of any one of examples 1-6, further including processing the short-range wireless signals received from the remote sensor to obtain information regarding movement of the towed object relative to the vehicle.

Example 8. The method of any one of examples 1-7, further including processing the short-range wireless signals received from the remote sensor to determine whether movement of the towed object relative to one or more antennas coupled to the receiver in the vehicle satisfies a dangerous or critical vehicle movement criterion; and including an indication of a critical event in the safety messages, such as populating a critical event flag in safety messages, in response to determining that the movement of the towed object relative to the one or more antennas coupled to receiver in the vehicle satisfies a dangerous or critical vehicle movement criterion.

The processors implementing various embodiments may be any programmable microprocessor, microcomputer or multiple processor chip or chips that can be configured by software instructions (applications) to perform a variety of functions, including the functions of the various aspects described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. As an illustration, both an application running on a processor of a communication device and the communication device may be referred to as a component. One or more components may reside within a process and/or thread of execution and a component may be localized on one processor or core and/or distributed between two or more processors or cores. In addition, these components may execute from various non-transitory computer-readable media having various instructions and/or data structures stored thereon. Components may communicate As a local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various aspects. Such services and standards may include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), EDGE, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), C-V2X, V2V, V2P, V2I, and V2N, etc. Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. As an example but not limitation, such non-transitory computer-readable or processor-readable storage media may include RAM, ROM, EEPROM, FLASH memory, CD-ROM or other optical disk storage, magnetic disk storage or other magnetic storage smart objects. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method performed by one or more processing systems of a vehicle connected to a towed object, comprising:
   determining a distance from one or more antennas coupled to a receiver in the vehicle to a remote sensor on the towed object by processing short-range wireless signals received from the remote sensor, wherein the remote sensor is a camera, and the short-range wireless signals encode image data from the camera;
   populating safety messages with a position of the vehicle and the towed object based on the determined distance from one or more antennas coupled to the receiver to the remote sensor;
   processing the short-range wireless signals received from the remote sensor to determine whether movement of the towed object relative to one or more antennas coupled to the receiver in the vehicle satisfies a dangerous or critical vehicle movement criterion; and
   including an indication of a critical event flag in the safety message in response to determining that the movement of the towed object relative to one or more antennas coupled to the receiver in the vehicle satisfies the dangerous or critical vehicle movement criterion.

2. The method of claim 1, wherein the safety messages are one of a Basic Safety Message (BSM), a "Cooperative Awareness Message" (CAM), or a "Decentralized Environmental Notification Message" (DENM).

3. The method of claim 1, wherein the short-range wireless signals are at least one of Wi-Fi, Bluetooth, or ultra-wide band signals.

4. The method of claim 1, further comprising:
   receiving the short-range wireless signals in a video monitoring system of the vehicle, wherein processing the short-range wireless signals received from the camera to determine the distance from one or more antennas coupled to the receiver in the vehicle to the remote sensor on the towed object is performed by the video monitoring system; and
   providing to a vehicle-to-everything (V2X) processing system the determined distance from one or more antennas coupled to the receiver in the vehicle to the camera on the towed object in a format that enables the V2X processing system to automatically populate fields in the safety message with information regarding locations or length of the vehicle and the towed object.

5. The method of claim 1, wherein the short-range wireless signals encode data from the remote sensor.

6. The method of claim 1, further comprising:
   processing the short-range wireless signals received from the remote sensor to obtain information regarding movement of the towed object relative to the vehicle.

7. A processing system for use in a vehicle, comprising:
   one or more transceivers configured to be coupled to one or more antennas on the vehicle; and
   a processor coupled to the one or more transceivers and configured with processor-executable instructions to:
      determine a distance from the one or more antennas to a remote sensor on a towed object by processing short-range wireless signals received from the remote sensor, wherein the remote sensor is a camera, and the short-range wireless signals encode image data from the camera;
      populate safety messages with a position of the vehicle and the towed object based on the determined distance from the one or more antennas to the remote sensor;
      process the short-range wireless signals received from the remote sensor to determine whether movement of the towed object relative to the one or more antennas on the vehicle satisfies a dangerous or critical vehicle movement criterion; and
      include an indication of a critical event in the safety messages in response to determining that the movement of the towed object relative to the one or more antennas on the vehicle satisfies the dangerous or critical vehicle movement criterion.

8. The processing system of claim 7, wherein the safety messages are one of a Basic Safety Message (BSM), a "Cooperative Awareness Message" (CAM), or a "Decentralized Environmental Notification Message" (DENM).

9. The processing system of claim 7, wherein the processor is further configured with processor-executable instructions such that the short-range wireless signals are at least one of Wi-Fi, Bluetooth, or ultra-wide band signals.

10. The processing system of claim 7, wherein the one or more transceivers is configured to receive the short-range wireless signals in a video monitoring system of the vehicle, wherein the processor is further configured with processor-executable instructions to:
   process the short-range wireless signals received from the camera to determine the distance from the one or more antennas on the vehicle to the remote sensor on the towed object is performed by the video monitoring system; and provide to a vehicle-to-everything (V2X) processing system the determined distance from the one or more antennas on the vehicle to the camera on the towed object in a format that enables the V2X processing system to automatically populate fields in a Basic Safety Messages with information regarding locations or length of the vehicle and the towed object.

11. The processing system of claim 7, wherein the processor is further configured with processor-executable instructions such that the short-range wireless signals encode data from the remote sensor.

12. The processing system of claim 7, wherein the processor is further configured with processor-executable instructions to:

process the short-range wireless signals received from the remote sensor to obtain information regarding movement of the towed object relative to the vehicle.

13. A processing system for use in a vehicle, comprising:

one or more antennas coupled to one or more transceivers;

means for determining a distance from the one or more antennas on the vehicle to a remote sensor on a towed object by processing short-range wireless signals received from the remote sensor, wherein the remote sensor is a camera, and the short-range wireless signals encode image data from the camera;

means for populating safety messages with a position of the vehicle and the towed object based on the determined distance from the one or more antennas to the remote sensor;

means for processing the short-range wireless signals received from the remote sensor to determine whether movement of the towed object relative to the one or more antennas satisfies a dangerous or critical vehicle movement criterion; and means for including an indication of a critical event in the safety messages in response to determining that the movement of the towed object relative to the one or more antennas satisfies the dangerous or critical vehicle movement criterion.

14. The processing system of claim 13, wherein the safety messages are one of a Basic Safety Message (BSM), a "Cooperative Awareness Message" (CAM), or a "Decentralized Environmental Notification Message" (DENM).

15. The vehicle of claim 13, wherein the short-range wireless signals are at least one of Wi-Fi, Bluetooth, or ultra-wide band signals.

16. The vehicle of claim 13, further comprising:

means for receiving the short-range wireless signals in a video monitoring system of the vehicle, wherein processing the short-range wireless signals received from the camera to determine the distance from the one or more antennas in the vehicle to the remote sensor on the towed object is performed by the video monitoring system; and means for providing to a vehicle-to-everything (V2X) processing system the determined distance from the one or more antennas to the camera on the towed object in a format that enables the V2X processing system to automatically populate fields in a Basic Safety Messages with information regarding locations or length of the vehicle and the towed object.

17. The vehicle of claim 13, wherein the short-range wireless signals encode data from the remote sensor.

18. The vehicle of claim 13, further comprising:

means for processing the short-range wireless signals received from the remote sensor to obtain information regarding movement of the towed object relative to the vehicle.

19. A non-transitory processor-readable medium having stored thereon processor-executable instructions configured to cause a processor of a vehicle processing system to perform operations comprising:

determine a distance from one or more antennas coupled to a receiver in the vehicle to a remote sensor on a towed object by processing short-range wireless signals received from the remote sensor, wherein the remote sensor is a camera, and the short-range wireless signals encode image data from the camera;

populating a safety message with a position of the vehicle and the towed object based on the determined distance from the one or more antennas to the remote sensor;

processing the short-range wireless signals received from the remote sensor to determine whether movement of the towed object relative to one or more antennas coupled to the receiver in the vehicle satisfies a dangerous or critical vehicle movement criterion; and including an indication of a critical event flag in the safety message in response to determining that the movement of the towed object relative to one or more antennas coupled to the receiver in the vehicle satisfies the dangerous or critical vehicle movement criterion.

* * * * *